United States Patent
Gayaldo

(10) Patent No.: US 11,477,321 B2
(45) Date of Patent: Oct. 18, 2022

(54) SYSTEMS AND METHODS FOR PROVIDING CALLER IDENTIFICATION OVER A PUBLIC SWITCHED TELEPHONE NETWORK

(71) Applicant: Successful Cultures, Inc, Incline Village, NV (US)

(72) Inventor: Michael Gayaldo, Cayucos, CA (US)

(73) Assignee: SUCCESSFUL CULTURES, INC., Incline Village, NV (US)

( * ) Notice: Subject to any disclaimer, the term of this patent is extended or adjusted under 35 U.S.C. 154(b) by 0 days.

(21) Appl. No.: 17/007,513

(22) Filed: Aug. 31, 2020

(65) Prior Publication Data
US 2020/0396332 A1  Dec. 17, 2020

Related U.S. Application Data

(63) Continuation of application No. 16/899,273, filed on Jun. 11, 2020, which is a continuation-in-part of application No. 16/653,292, filed on Oct. 15, 2019, now Pat. No. 10,992,801, which is a continuation-in-part of application No. 16/268,759, filed on Feb. 6, 2019, now Pat. No. 10,477,013.

(Continued)

(51) Int. Cl.
H04M 3/42 (2006.01)
H04M 3/54 (2006.01)
H04M 3/46 (2006.01)

(52) U.S. Cl.
CPC ... *H04M 3/42042* (2013.01); *H04M 3/42068* (2013.01); *H04M 3/42102* (2013.01); *H04M 3/42204* (2013.01); *H04M 3/465* (2013.01); *H04M 3/543* (2013.01); *H04M 2203/6045* (2013.01)

(58) Field of Classification Search
CPC ......... H04M 3/42042; H04M 3/42068; H04M 3/42102; H04M 3/42204; H04M 3/465; H04M 3/543; H04M 2203/6045
USPC .......................... 379/142.01, 142.06, 142.17
See application file for complete search history.

(56) References Cited

U.S. PATENT DOCUMENTS 6,285,750 B1   9/2001   Brachman et al.
6,301,339 B1  10/2001   Staples et al.
(Continued)

OTHER PUBLICATIONS

International Search Report; PCTUS20/55670; dated Jan. 12, 2021.
(Continued)

*Primary Examiner* — Binh Kien Tieu
(74) *Attorney, Agent, or Firm* — Caldwell Intellectual Property Law

(57) ABSTRACT

A system and method of providing caller identification (ID) over a public switched telephone network (PSTN). For outbound calls, the system and method enable a caller to provide a caller ID that differs from the native caller ID of their mobile phone. The system and method enable multiple phones tied to a single account to display the same caller ID for outbound calls. For forwarded inbound calls, such as calls being forwarded from an office, the system and method inform the recipient of the identification of the call as well as that the call is being forwarded. The system and method enable the recipient to have calls forwarded from more than one number and identify the identity of the caller as well as the specific number the call is being forwarded from.

20 Claims, 13 Drawing Sheets

Related U.S. Application Data

(60) Provisional application No. 62/769,423, filed on Nov. 19, 2018, provisional application No. 62/771,942, filed on Nov. 27, 2018, provisional application No. 62/776,761, filed on Dec. 7, 2018.

(56) References Cited

U.S. PATENT DOCUMENTS

| | | | |
|---|---|---|---|
| 6,477,246 B1 | 11/2002 | Dolan et al. | |
| 6,678,265 B1 | 1/2004 | Kung et al. | |
| 7,103,010 B2 | 9/2006 | Melideo | |
| 7,308,101 B2 | 12/2007 | Wing | |
| 8,000,739 B2 | 8/2011 | Bajpai et al. | |
| 8,199,746 B2 | 6/2012 | Rosenberg et al. | |
| 8,494,134 B2* | 7/2013 | Clark | H04Q 3/72 |
| | | | 379/142.06 |
| 8,639,225 B2 | 1/2014 | Nzumafo | |
| 8,856,359 B2* | 10/2014 | Guedalia | H04L 61/2596 |
| | | | 709/228 |
| 8,953,771 B2 | 2/2015 | Wing | |
| 9,882,865 B1 | 1/2018 | Sipher et al. | |
| 2002/0118805 A1 | 8/2002 | Miller et al. | |
| 2002/0181681 A1* | 12/2002 | Mani | H04M 3/42 |
| | | | 379/142.03 |
| 2003/0147518 A1* | 8/2003 | Albal | H04M 3/42 |
| | | | 379/88.19 |
| 2005/0281401 A1* | 12/2005 | Creamer | H04M 15/06 |
| | | | 379/142.06 |
| 2008/0139228 A1 | 6/2008 | Raffel et al. | |
| 2011/0244854 A1* | 10/2011 | Hansson | H04M 15/8044 |
| | | | 455/426.1 |
| 2012/0300914 A1* | 11/2012 | Baccay | H04M 1/575 |
| | | | 379/88.12 |
| 2014/0370865 A1* | 12/2014 | Wilhelm | H04M 3/4228 |
| | | | 455/415 |
| 2015/0024717 A1* | 1/2015 | Kochhar | H04W 4/06 |
| | | | 455/414.1 |
| 2015/0024725 A1 | 1/2015 | Lang et al. | |
| 2017/0064525 A1 | 3/2017 | Ben Arzi et al. | |
| 2020/0367027 A1* | 11/2020 | Ben Arzi | H04M 3/42059 |

OTHER PUBLICATIONS

Dalgic, et al., True Number Portability and Advanced Call Screening in a SIP-Based IP Telephony System, magazine, Jul. 1999 Retrieved from: http://citeseerx.ist.psu.edu/viewdoc/download?doi=10.1.1,32.1662&rep=rep1&type=pdf.

Tu, et al., Toward Authenticated Caller ID Transmission: The Need for a Standardized Authentication Scheme in Q.731.3 Calling Line Identification Presentation, journal Retrieved from: https://adamdoupe.com/publications/toward-authenticated-caller-id-transmission-itu2016.pdf.

* cited by examiner

SYSTEMS AND METHODS FOR PROVIDING CALLER IDENTIFICATION OVER A PUBLIC SWITCHED TELEPHONE NETWORK

CROSS REFERENCE TO OTHER APPLICATIONS

The present application is a continuation of U.S. Nonprovisional patent application Ser. No. 16/899,273, filed on Jun. 11, 2020 and entitled "SYSTEMS AND METHODS FOR PROVIDING CALLER IDENTIFICATION OVER A PUBLIC SWITCHED TELEPHONE NETWORK," which is a continuation-in-part of U.S. Nonprovisional patent application Ser. No. 16/653,292, filed on Oct. 15, 2019, and entitled "SYSTEMS AND METHODS FOR PROVIDING CALLER IDENTIFICATION OVER A PUBLIC SWITCHED TELEPHONE NETWORK," which is a continuation in part of U.S. Non-provisional patent application Ser. No. 16/268,759, filed on Feb. 6, 2019 and entitled "SYSTEMS AND METHODS FOR PROVIDING CALLER IDENTIFICATION OVER A PUBLIC SWITCHED TELEPHONE NETWORK" which claims the benefit of priority under 35 U.S.C. § 119 to U.S. Provisional Patent Application No. 62/769,423, filed Nov. 19, 2018, entitled "System and Method for Providing Caller ID over PSTN", U.S. Provisional Patent Application No. 62/771,942, filed Nov. 27, 2018, entitled "System and Method for Providing Caller ID over PSTN", and U.S. Provisional Patent Application No. 62/776,761, filed on Dec. 7, 2018, entitled "System and Method for Providing Caller ID over PSTN." The disclosures of each of U.S. Nonprovisional patent application Ser. No. 16/899,273, U.S. Nonprovisional patent application Ser. No. 16/653,292, U.S. Non-provisional patent application Ser. No. 16/268,759, U.S. Provisional Patent Application No. 62/771,942, and U.S. Provisional Patent Application No. 62/776,761 are incorporated herein by reference in their entireties.

FIELD OF THE INVENTION

The present invention generally relates to the field of telecommunications. In particular, the present invention is directed to systems and methods for providing caller identification over a public switched telephone network.

BACKGROUND

A person, such as but not limited to professionals like salesmen, doctors, and lawyers, may have the need to place a call to a client, a customer, a potential client, or a potential customer from a personal mobile device. For example, caller may be out of the office when the need arises to make the call. Likewise, the need to make a call may be after hours or on a weekend. The caller may not want to place the call with a mobile device because the recipient of the call will have access to the professional's personal mobile number due to caller identification (ID). This may lead to lost opportunities and/or customer dissatisfaction. Existing systems do not solve this problem in a satisfactory manner. Where calls are forwarded from a work or office phone to a personal cell phone, for instance, the cell phone can typically show either the caller ID of the phone number it is being forwarded from, or the caller ID of the phone placing the call but does not typically have access to both; this can exacerbate confusion, rather than solving it. Some phone systems that utilize voice over internet protocol (VOIP) provide a forwarded telephone call to include more complete information. However, VOIP calls provide communication services over the Internet instead of via the PSTN. Thus, the quality of such calls may be diminished and choppy in comparison to phone calls made via PSTN.

SUMMARY OF THE DISCLOSURE

In an aspect, a system for call placement over a publicly switched telephone network includes a first device having a first telephone number and first caller identification, wherein the first device is designed and configured to place a first call to a server, wherein the first call is placed to a second telephone number associated with the first device and the call is transmitted over a publicly switched telephone network, transmit data to the server via a different channel than the first call, wherein the data directs the server to associate predetermined caller identification with a second audio call to a second device, wherein the predetermined caller identification differs from the first caller identification, and initiate the second call.

In another aspect, a method of call placement over a publicly switched telephone network includes placing, by a first device having a first telephone number and first caller identification a first call to a server, wherein the first call is placed to a second telephone number associated with the first device and the call is transmitted over a publicly switched telephone network, transmitting, by the first device, data to the server via a different channel than the first call, wherein the data directs the server to associate predetermined caller identification with a second audio call to a second device, wherein the predetermined caller identification differs from the first caller identification, and initiating the second call.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

The embodiments described herein relate to a system and method of providing caller identification (ID) over a public switched telephone network (PSTN). As used in this disclosure, a PSTN is a network including one or more telephone networks, such as without limitation circuit-switched telephone networks; PSTN may include all circuit-switched telephone networks, in a manner analogous to inclusion of computer networks in the Internet. Circuit-switched telephone networks, as used herein, may include wired telephonic networks operating over electronic telephone wires, cellular networks placing or carrying calls between cellular phones, digital cellular networks PSTN may operate according to standards promulgated by the International Telegraph Union (ITU), such as without limitation the ITU Telecommunication Standardization Sector (ITU-T). For outbound calls, the system and method enable a caller to provide a caller ID that differs from the native caller ID of their mobile phone. The system and method enable multiple phones tied to a single account to display the same caller ID for outbound calls. For forwarded inbound calls, such as calls being forwarded from an office, the system and method inform the recipient of the ID of the call, and/or that the call is being forwarded. The system and method enable the recipient to have calls forwarded from more than one number and identify the identity of the caller as well as the specific number that the call is being forwarded from.

Figure 7:
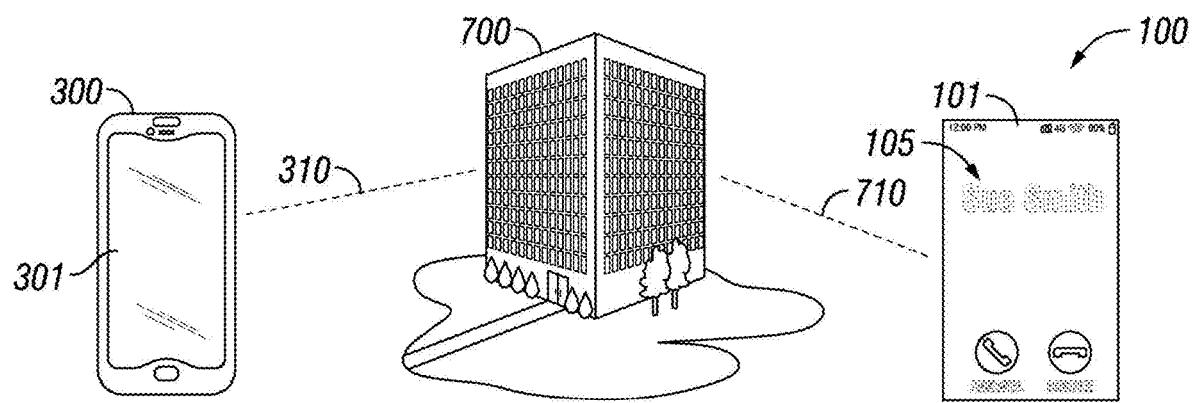
FIG. 7 shows a schematic of a prior system forwarding a phone call.
Figure 8:
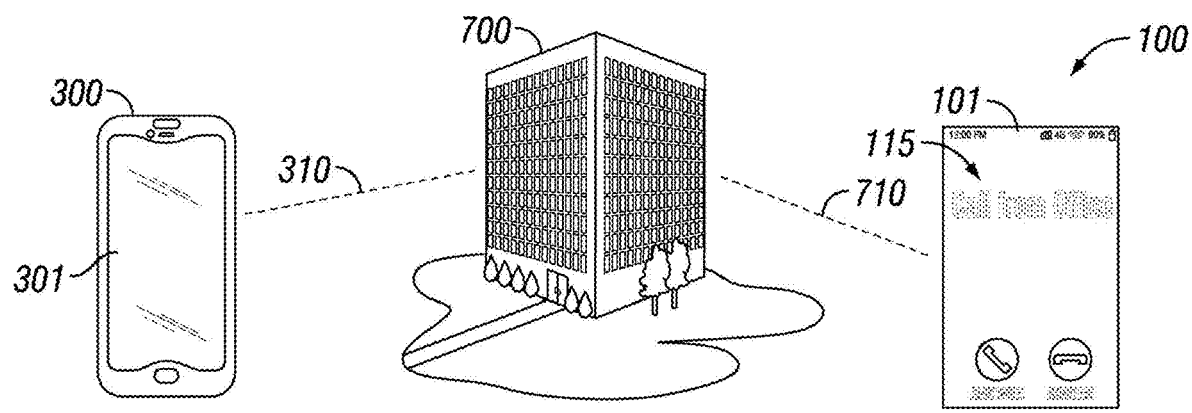
FIG. 8 shows a schematic of a prior system forwarding a phone call.

A person may have calls forwarded from a work or office phone to a personal cell phone. When a call is forwarded, typically the cell phone can show either the caller ID of the phone number it is being forwarded from, such as shown in FIG. 8, or the caller ID of the phone placing the call, such as shown in FIG. 7. If the caller ID only indicates the caller ID of the forwarded number as shown in FIG. 8, the recipient of the call knows the call is coming from the forwarded telephone number, which may be an office, but the recipient does not know the identification of the caller. Thus, the recipient may answer an undesired call. The recipient may answer the call differently if the recipient is aware of the identification of the caller. If the caller ID only indicates the caller ID of the caller as shown in FIG. 7, the recipient of the call may not recognize that the call is being forwarded, which may cause the recipient to answer the call in a different manner than if it was recognized as a call being forwarded from a third number, such as an office.

Some phone systems that utilize voice over internet protocol (VOIP) provide a forwarded telephone call to include both the caller ID of the caller as well as the identification of a forwarded number. However, VOIP calls provide communication services over the Internet instead of via the PSTN. Thus, the quality of such calls may be diminished and choppy in comparison to phone calls made via PSTN. Embodiments disclosed herein resolve these and other problems arising within the technology of telecommunications. Specific means and methods for resolution of the above-described problems are disclosed and claimed below.

Figure 1:
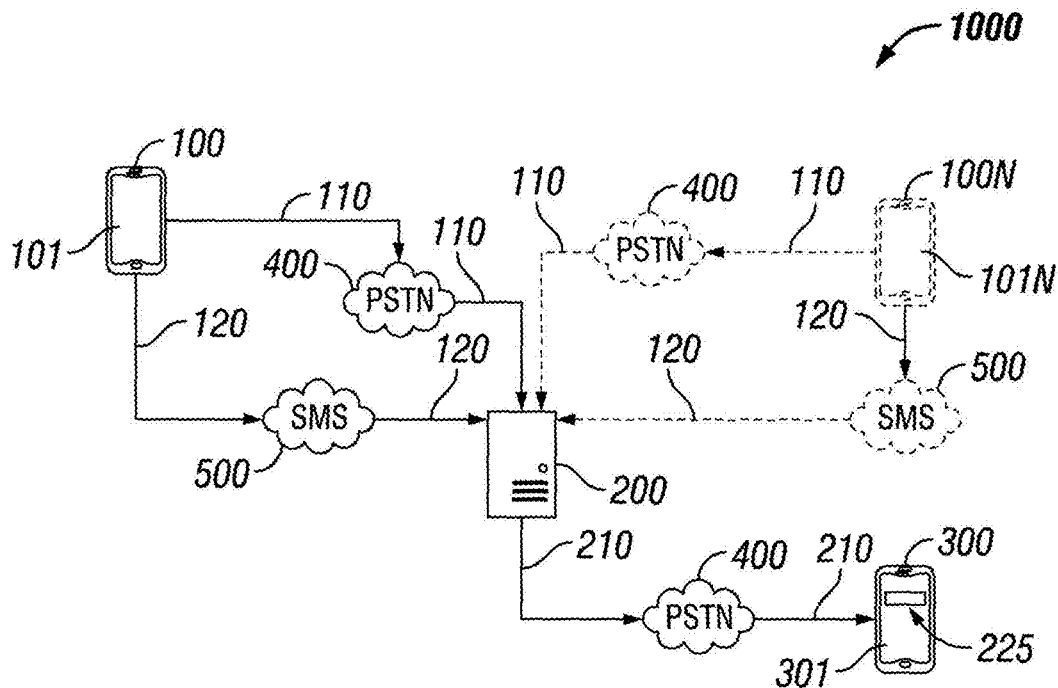
FIG. 1 shows a schematic of one embodiment of a system of the present disclosure for an outbound phone call.

FIG. 1 shows an exemplary embodiment of a system 1000 for providing caller ID over the PSTN. The system includes a first device 100 having a display, or screen, 101. First device 100 has a first telephone number and a first caller ID associated with the first telephone number. First device may be any computing device as described below in reference to FIG. 15, including without limitation a mobile telephonic device such as a cellular phone, digital phone, tablet enabled to place phone calls, or the like; such mobile telephonic devices are referred to in this disclosure as "cell phones." First device 100 may include, without limitation, a personal cell phone of a user of the system 1000. As a further non-limiting example, first device 100 may include a work cell phone of the user of the system 1000. System 1000 may be accessed via an application ("app") downloaded on the first device 100; app may be any suitable program as described below in reference to FIG. 15; app may, for instance, include a web application running on a browser operated by first device 100, a native app, such as a "mobile app" executed on first device 100 without a web browser, or any other suitable form of program or application that may occur to a person skilled in the art, upon reviewing the entirety of this disclosure. An app user, such as without limitation a user of first device 100, may utilize the app on the first device 100 to call another telephone without disclosing the first caller ID, which may be associated with the native telephone number of the first device 100. For example, the app user may want to call a client, but may not want the client to have access to the telephone number of the app user's cell phone, i.e. the first device 100; as a further non-limiting example, app user may wish client to call app user's office telephone, optionally in conjunction with a call-forwarding system or method, including without limitation call-forwarding systems for inbound calls as set forth in further detail below in reference to FIGS. 3-6 and 10, and/or utilizing one or more elements and/or process steps thereof.

Still referring to FIG. 1, after downloading app to the first device 100, app user may establish a user account within the app; for example, app user may establish a username and password associated with the account. App user may provide billing information while setting up the account. Additionally, app user may provide a predetermined caller ID to be associated with the first device when making a telephone call using the app. For example, the predetermined caller ID may include an office telephone number associated with the app user. App user may provide multiple predetermined caller IDs to potentially be associated with the first device when making a telephone call using the app; for example, and without limitation, the app user may have multiple office locations each having a different telephone number, which correspond to the multiple predetermined caller IDs. Where there is a plurality of predetermined caller IDs, app may prompt user to select one of the multiple predetermined caller IDs, for instance and without limitation via a user interface component such as a radio button, drop-down list, or the like. Alternatively or additionally, app may extract or retrieve one or more candidate numbers from which to select a telephone number to include in predetermined caller ID; as a non-limiting example, app may access contacts of user on first device 100 and select one or more telephone numbers associated with user from contacts. For instance, and without limitation, user may include a number labeled "office," "work," or the like in contacts stored on first device 100, indicating a telephone number of the user's work phone; app may select this number as part of predetermined caller ID, and may display selected number to user. App may give user the ability to override default selection by entering a user command via a button or text field deleting selection and/or overwriting default selection with user-entered information. As a further non-limiting example, app may retrieve or extract a plurality of candidate telephone numbers from contacts, for instance by scanning contacts for entries corresponding to "work," "office," "me," or the like; candidates may be presented to user by app in a list or other display, which may permit user to refuse or modify each candidate as described above. App may require the app user to confirm rights in the selected predetermined caller ID or multiple predetermined caller IDs; this may be performed, without limitation, by presenting a logon screen for the user to provide logon credentials such as, without limitation, a username and password.

With continued reference to FIG. 1, system 1000 includes a server 200. Server 200 may include any computing device as described below in reference to FIG. 15. Server 200 may include, without limitation, any server as described below in reference to FIG. 15. Server may alternatively or additionally include a desktop computer, a handheld device or mobile device such as a smartphone or tablet, and/or a special purpose device; any such device may include or be included in server 200 where configured as set forth in further detail below. Server 200 may include two or more devices working in concert or in parallel; server 200 may include, for instance, a first server or cluster of servers in a first location and a second server or cluster of servers in a second location. Server 200 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Server 200 may include one or more computing devices dedicated to data storage, security, distribution of traffic for load balancing, and the like. Server 200 may distribute one or more computing tasks as described below across a plurality of computing devices of server 200, which may operate in parallel, in series, redundantly, or in any other manner used for distribution of tasks or memory between computing devices. Server 200 may be implemented using a "shared nothing" architecture in which data is cached at the worker; in an embodiment, this may enable scalability of system 100 and/or server 200. In an embodiment, server 200 may communicate locally or over a network to one or more remote devices to perform one or more embodiments of processes and/or process steps as disclosed in further detail below; communication may include, without limitation, communication with any other device as described herein.

Still referring to FIG. 1, server 200 may be designed and/or configured to perform any method, method step, or sequence of method steps in any embodiment described in this disclosure, in any order and with any degree of repetition. For instance, server 200 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Server 200 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Server 200 may be designed and configured to perform any method and/or method steps as described herein, including without limitation methods and/or method steps described below in reference to FIGS. 9-16, in any order or combination, or with any degree of iteration or repetition.

Still referring to FIG. 1, server 200 is designed and configured to assign a second telephone number to the first device 100; this may be performed, in an embodiment, after user sets up an account as described above. Second telephone number assigned to the first device 100 may be a unique number; as used herein, "unique" signifies that second telephone number is unique at least within PSTN with which devices in system 1000 are communicating or otherwise interacting as set forth in further detail herein. Uniqueness may include a higher degree of uniqueness, such as uniqueness within a plurality of PSTNs, within all PSTNs that system 1000 interacts with, within all PSTNs in existence, or the like. Uniqueness may include a number generated according to protocols for generation of globally unique identifiers (GUIDs) and/or universally unique identifiers (UUIDs). For example, and without limitation, second telephone number assigned to first device 100 may be a unique ten (10) digit telephone number now associated with the first device 100. To place a call using app, app user may open the app and selects a client or other person to call. For example, a client may be selected from a contact list contained within the app. The contact list may include a telephone number of client; telephone number of client may be a first destination device telephone number of a first destination device 300. Selection may be performed by any suitable process or facility for selecting and/or calling a contact number, such as without limitation a voice command or manually entered to call client and/or other person by name, a voice command or manually entered command to call client and/or other person by a description of professional relationship or the like, or any other suitable process; in an embodiment app may be initialized or started up by such a command, rather than being manually or otherwise opened by user. Alternatively, the app user may manually or otherwise enter the first destination device telephone number of a first destination device 300 in the app. As a further non-limiting example, app may present data to user via audio output such as without limitation speech-to-text output or the like; thus, as a non-limiting illustration, user may activate app using a voice command or by tapping or selecting a visually depicted event handler on a screen of first device 100, and app may respond with a voice prompt asking the user whether the user wishes to place a call, and/or may place the call to second number without further prompting. Further continuing the example, app may issue a subsequent voice prompt requesting a destination number and user may provide the first destination device telephone number via verbal command or any other suitable data entry process. Prompt to enter first destination device telephone number may originate at app or at server 200; for instance, server 200 may send a request for first destination device telephone number via any of PSTN 400, network 600, and/or texting service 500 upon receiving either PSTN call or data (as set forth in further detail below) from first device 100, and app may subsequently output the request or a prompt based on the request to user. App and/or server may provide other prompts to user, such as without limitation a request for user to specify a device user wishes to appear as caller ID on first destination device as provided in further detail below; user may enter desired caller ID information and/or select desired caller ID information from a list including two or more telephone numbers, such as without limitation the user's office phone, mobile phone, home phone, and/or other numbers. Persons skilled in the art, upon reviewing the entirety of this disclosure, will be aware of various ways in which initialization and/or function calls to app, initialization of a phone call via app, and/or entry of first destination device telephone number may be performed consistently with this disclosure.

With continued reference to FIG. 1, upon selecting, entering, and/or otherwise specifying first destination device 300 telephone number of first destination device 300, whether manually or via a contacts list, first device 100 dials the second telephone number associated with the first device 100 creating an audio call 110 between the first device 100 and the server 200 via the PSTN 400. Audio call 110 may be placed according to any protocol or procedure suitable for placement of an audio call over a PSTN. Persons skilled in the art, upon reviewing the entirety of this disclosure, will be aware of various ways in which audio call 110 may be placed as consistent with this disclosure. Audio call 110 may be placed using components, circuits, and/or modules of first device 100 usable for placement of audio calls; audio call 110 may be placed using app, which may invoke a telephone application on first device 100 to place audio call 110.

Still referring to FIG. 1, first device 100 communicates data 120 to server 200 via a different channel than the audio call 110; communication of data 120 to server may be performed substantially simultaneously with audio call 110, where "substantially simultaneously" denotes provision of data 120 and audio call 110 close enough together that a user experience of time taken for placement of the call to first destination device, is equivalent to user experience of time taken for placement of a typical telephone call; data 120 may be conveyed before, after, or concurrently with audio call 110. Data 120 may be conveyed via any suitable channel of wired or wireless electronic communication that is not the channel used for audio call 110. For example, the data 120 may be communicated via simple message system (SMS) 500 or another text-messaging protocol to the server 200 as shown in FIG. 1. As another example, the data 120 may be communicated over the Internet 600 via various Internet protocols such as packet-based communication protocols to the server 200 as shown, as a non-limiting example, in FIG. 2. For example, the data may be communicated via hypertext transfer protocol (HTTP), secure HTTP (HTTPS), transmission control protocol-Internet protocol (TCP-IP), or the like as would be appreciated by one of ordinary skill in the art having the benefit of this disclosure. Data may be received via at least one of a text messaging protocol such as SMS and a packet-based network such as the Internet, meaning that data may be received via the text messaging protocol, the packet-based network, or a combination of the two. Data 120 may be received slightly before, simultaneously, or slightly after receiving the first audio call from the first device 100. Data 120 sent to the server 200 may include the first destination device telephone number of the first destination device 300; in other words, the data 120 may include the telephone number that the app user desires to call and corresponding to a device and/or receiving user with whom user wishes to place the call. Data 120 may also include predetermined caller ID that the app user desires to present to the first destination device 300 rather than the first caller ID of the first device 100. Data 120 may also include a username and password of the app user from the first device 100. Data 120 may include any suitable additional data usable for performance of any portion of any method as described in this disclosure, including additional information concerning app user, first device 100, second telephone number and/or other information; any of these exemplary elements may alternatively be excluded from data 120 and/or concealed from first destination device and/or a user thereof. Data 120 may include information needed to validate identity of device 100; server 200 may use data 120 to authenticate first device 100 and/or user of first device 100.

Continuing to refer to FIG. 1, server 200 may recognize audio call 110 from first device 100 based on second telephone number dialed by the first device 100 as described above. The server 200 may attempt to validate the first audio call 110 based on receipt of data 120 also from the first device 100, which may include the app user's username and password. A second audio call 210 is communicated from the server 200 to the first destination device 300 via the PSTN 400; this may occur after validation by the server 200, and may, for instance, not proceed if server 200 fails to validate first audio call 110, for instance owing to a mismatch with data 120. Second audio call may be placed using first destination device telephone number of first destination device 300. Second audio call 210 connects the first destination device 300 with the first device 100. The server 200 causes predetermined caller ID 225, for instance as received in data 120, to be displayed on the screen, or display, 301 of the first destination device 300 during the second audio call 210 rather than the first caller ID of the first device 100. Where user selected one of a plurality of predetermined caller IDs as described above, server 200 may cause first destination device to display selected predetermined caller ID.

Still referring to FIG. 1, an account on app may be associated with any number of mobile devices, also referred to as additional subscriber devices; for example, a second device, also referred to as an additional subscriber device, 100N may be associated with the account. Additional subscriber device 100N may include any device suitable for use as first device as described above. Additional subscriber device 100N has a screen 101N, a third telephone number, and a second caller ID associated with the third telephone number. Third telephone number of additional subscriber device 100N may differ from first telephone number of the first device 100. Third telephone number may be a native telephone number of additional subscriber device 100N. As with first device 100, additional subscriber device 100N may include without limitation a personal cell phone or a work cell phone of a user of the system 1000. After setting additional subscriber device 100N on the account, the server 200 of the system 1000 may assigns a fourth telephone number to additional subscriber device 100N; this may be performed according to any process and using any means suitable for assigning second telephone number to first device 100 as described above. Fourth telephone number assigned to additional subscriber device 100N may be a unique number, where "unique" may have any meaning associated with "unique" as referring to second telephone number as described above. For example, fourth telephone number assigned to additional subscriber device 100N may be a unique ten (10) digit telephone number now associated with the additional subscriber device 100N; fourth telephone number may differ from second telephone number assigned to first device 100.

To place a call using the app, the app user of additional subscriber device, or second device, 100N may open the app and select a client, person, or device to call; client and/or person may operate a second destination device to be called (not shown). Upon selecting a second destination device telephone number of second destination device, the second destination device telephone number being a telephone number associated with the second destination device in the same way that first destination device telephone number is associated with first destination device as described above, additional subscriber device 100N may dial fourth telephone number associated with the additional subscriber device 100N creating an audio call 110 between the additional subscriber device 100N and the server 200 via the PSTN 400; this may be performed as described above for placement of audio call 110 from first device 100 to PSTN 400. Substantially simultaneously, the additional subscriber device 100N may communicate data 120 to the server 200 via a different channel than the audio call 110; this may be performed as described above for communication of data 120 from first device 100 to server 200, where "substantially simultaneously" has the same meaning as that described above for conveyance of data 120 from the first device 100 to the server. For example, data 120 may be communicated via SMS 500, packet-based communication, or the like to the server 200 as shown in FIG. 1. As discussed herein, an audio call may be placed to second destination device by server 200 based on data 120 connecting additional subscriber device 100N to second destination device. First device 100 and additional subscriber devices 100N are shown in FIG. 1 for illustrative purposes and the number of the devices 100, 100N may be varied as would be appreciated by one or ordinary skill in the art having the benefit of this disclosure. An account on system 1000 may include one, two, or more subscriber devices as would be appreciated by one or ordinary skill in the art having the benefit of this disclosure. The number, size, shape, and/or configuration of first device 100, server 200, and/or second device 300 are shown in FIG. 1 for illustrative purposes only and may be varied depending on the application as would be appreciated by one of ordinary skill in the art having the benefit of this disclosure. For example, system 1000 may include one or more servers 200.

Figure 2:
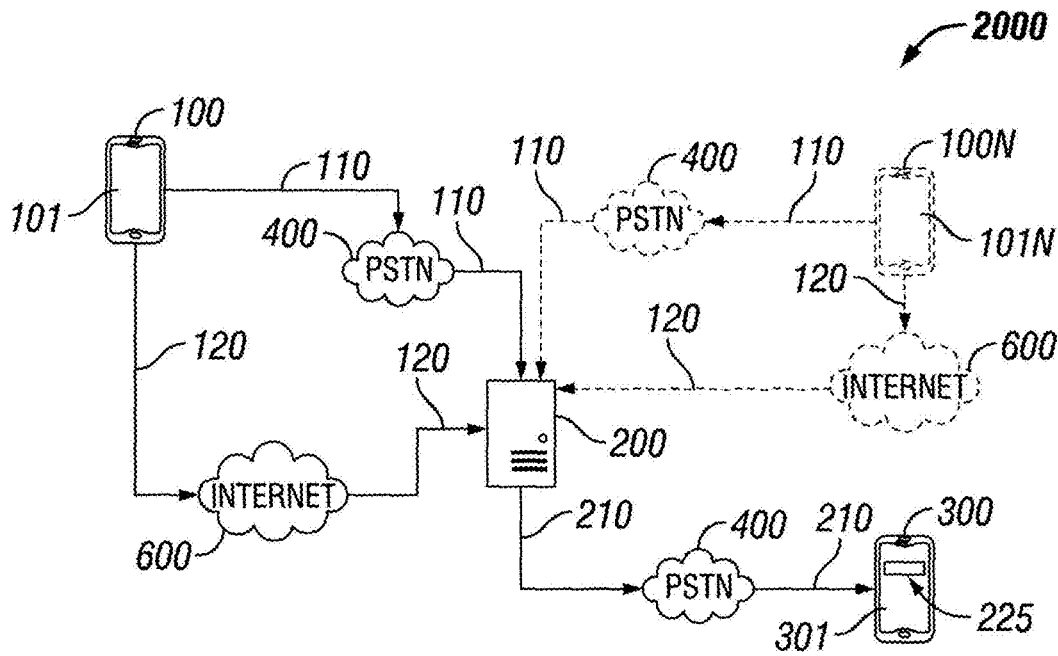
FIG. 2 shows a schematic of one embodiment of a system of the present disclosure for an outbound phone call.

FIG. 2 shows an exemplary embodiment of a system 2000 for providing caller ID over the PSTN. The system includes a first device 100 having a first telephone number and a first caller ID associated with the first telephone number; first device 100 may include any device suitable for use as first device 100 as described above in reference to FIG. 1. As discussed above, first device 100 may call a second telephone number associated with first device 100 to create a first audio call 110 with server 200. As with system 1000 of FIG. 1, first device 100 communicates data 120 to server 200 via a different channel than audio call 110. Data 120 may be communicated over the Internet 600 via various Internet protocols to server 200 as shown in FIG. 2, and as described above in connection with FIG. 1; alternatively or additionally, data 120 may be communicated to server 200 via text-messaging services, for example as described above in reference to FIG. 1. Server 200 may connect an audio call 210 to a first destination device 300 via PSTN 400 based on the first audio 110 and the data 120 received via the Internet 600 connecting first device 100 to the first destination device 300. Server 200 causes a selected predetermined caller ID 225, if the app user has more than one predetermined caller ID, to be displayed on a screen, or display 301 of first destination device 300 during second audio call 210 rather than first caller ID of the first device 100; this may be implemented, without limitation, as described above in reference to FIG. 1.

As discussed herein, and still referring to FIG. 2, an account on the app may be associated with any number of mobile devices; for example, an additional subscriber device 100N may be associated with the account, as described above in reference to FIG. 1. Additional subscriber device 100N may also create an audio call 110 via PSTN 400 and provide data 120 via the Internet 600; this may be implemented, without limitation, as described above in reference to FIG. 1. Likewise, additional subscriber device 100N may provide data 120 on a channel different from first device 100. For example, first device 100 may provide data 120 to server 200 via the Internet 600 whereas additional subscriber device 100N of system 2000 may provide data 120 via SMS 500, or the like, as would be appreciated by one of ordinary skill in the art having the benefit of this disclosure. First devices 100 and one or more additional subscriber devices 100N are shown in FIG. 2 for illustrative purposes. An account on system 2000 may include one, two, or more devices as would be appreciated by one or ordinary skill in the art having the benefit of this disclosure. The number, size, shape, and/or configuration of first device 100, server 200, and/or second device 300 are shown in FIG. 2 for illustrative purposes only and may be varied depending on the application as would be appreciated by one of ordinary skill in the art having the benefit of this disclosure. For example, system 2000 may include one or more servers 200.

Figure 3:
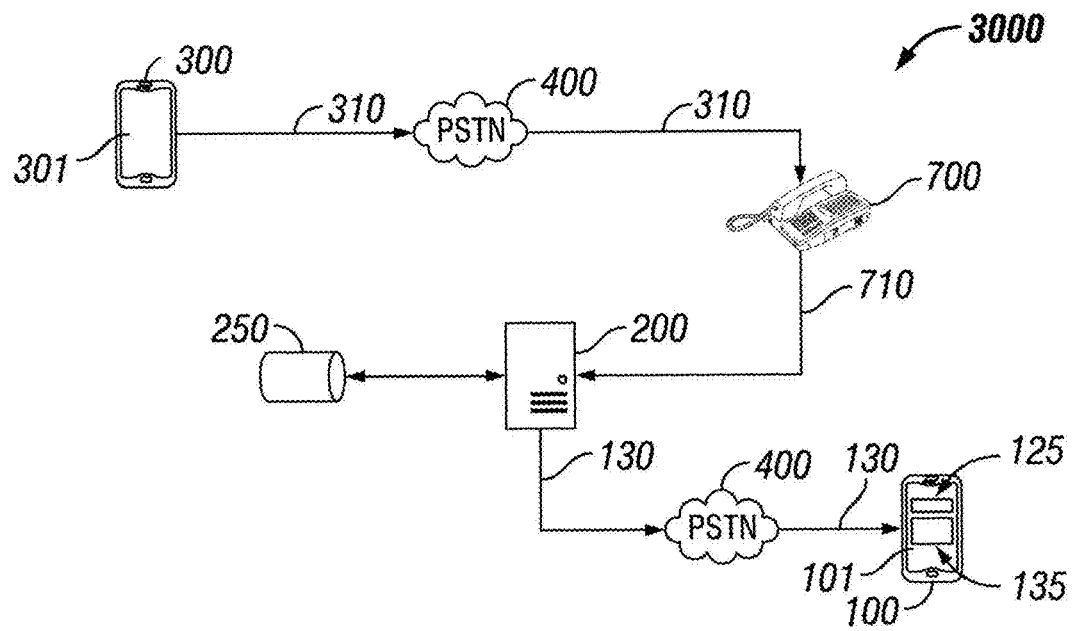
FIG. 3 shows a schematic of one embodiment of a system of the present disclosure for an inbound phone call forwarded from a different telephone number.

FIG. 3 shows a system 3000 for forwarding a telephone number. A call 310 may be placed by a second device 300 to a device, or location, 700, which may be located at and/or associated with in the PSTN an office or home number. Call 310 may be placed, without limitation, to a third telephone number associated with device or location 700. Second device 300 may include, without limitation, any device suitable for use as first device 100 and/or first destination device as described above; second device 300 may include or be a first destination device 300 in systems 1000, 2000, as suggested and illustrated in FIG. 3, or may be a different device. It should be noted that in different iterations of methods performed by systems as described in this disclosure, the same device may operate as first device 100 in a one iteration, a first destination device 300 and/or second destination device in another iteration, and/or a second device 300 in still another iteration. In other words, second device 300 may have received an office or home number, such as a telephone number from one or more calls as placed by or in system 1000 and/or system 2000, for instance as second caller ID as described above in reference to FIGS. 1 and 2; second device 300 may alternatively or additionally acquire a telephone number from alternative channels, contacts of second device 300 or the like. Call 310 may be placed via the PSTN 400. Upon receiving call 310, call is forwarded 710 via a first forwarding number to a server 200; server 200 may be or include any device or devices suitable for use as a server 200 as described above in reference to FIGS. 1 and 2, and server 200 may be server 200 of a system as described above in reference to FIGS. 1 and 2 or a distinct server. Call forwarding may be performed, without limitation, by any call-forwarding system implemented within a PSTN, including without limitation configuration of one or more switches, servers, or cloud servers (not shown) in PSTN to forward a call to first forwarding number; alternatively or additionally, call 710 may be forwarded by device 700. Call 710 to first forwarding number may be directed via PSTN to Server 200. Server 200 may be configured to associate first forwarding number with a first device 100, including without limitation a first device 100 as described above in reference to FIGS. 1 and 2, as described above; for instance, and without limitation, first forwarding number may be assigned to a port at server 200, a user account set up at server, or the like. As a result, server 200 may automatically determine that a call to first forwarding number, arriving at server, is to be forwarded to a first device 100 and/or any device specified by user account or other data structure or record associated with first forwarding number. Server 200 may further associate first forwarding number with device 700, permitting information concerning device 700 to be retrieved based on first forwarding number as well. First forwarding number may be unique, where "unique" signifies uniqueness as defined above in reference to FIGS. 1-2 and with regard to second telephone number. Server 200 may also associate first forwarding number to an application, which may include without limitation an app as described above in reference to FIGS. 1 and 2 and/or include a distinct or related application, running on a first device 100, which may be a personal mobile phone of a subscriber to an application running on server 200.

Still referring to FIG. 3, server 200 may generate server call data. Server call data may include any information that server 200 may forward or transmit to first device 100 regarding calls 310, 710, or further calls placed or connected by server 200 for forwarding calls 310, 710, including without limitation information describing device 700, third telephone number as dialed by second device 300, call 310, call 710, first device 100, and/or account information stored on server regarding first device 100. Server 200 may retrieve part of server call data from data stored at server 200 that is associated with first forwarding number, first device 100, and/or user account using link of first forwarding number to such data. Server 200 may receive part of server call data from PSTN as part of call 710.

Server 200 may assign a logo to first forwarding number and/or another datum associated with first forwarding number as described above. Alternatively or additionally, logo may be stored on first device 100, for instance in memory associated with app, as entered using app. Logo may be been selected by the app user to indicate a call being forwarded to the first device 100 from the telephone number assigned to use the first forwarding number; selection may, for instance, have occurred prior to placement of call 710. Logo may be specific to a particular number or set of numbers; this may, for instance, inform user who is calling, or what device is calling, permitting user to prepare to respond accordingly. Logo may include any visual indicator usable to indicate a call being forwarded to first device 100, including without limitation an image, emoticon, one or more elements of textual data, and/or any combination thereof. Server 200 may use various indicators such as a logo to indicate that a call is being forwarded to the first device 100 as would be appreciated by one or ordinary skill in the art having the benefit of this disclosure. For example, the server 200 may use a picture, text, a symbol, a design, or the like to indicate that a call is being forwarded to the first device 100.

Continuing to refer to FIG. 3, based on first forwarding number, an audio call 130 via PSTN 400 connects second device 300 to first device 100; this may be performed according to any suitable process for connecting two devices using a PSTN call, for instance as described above in reference to FIGS. 1-2. Server 200 may cause a screen or display 101 on the first device 100 to display information 125, which may include any data suitable for use as server call data as described above; information 125, or data usable by first device 100 to retrieve information 125, may be supplied over PSTN to first device 100. Information 125 may be displayed by first device 100 using a display typically used by first device to display call information received via PSTN, such as caller identification information received via PSTN. Server 200 may cause screen or display 101 to display an additional field 135. Additional field 135 may include any data suitable for use as server call data; in an embodiment, data displayed in additional field 135, and/or data usable by first device to retrieve data to be displayed in additional field 135, may be transmitted via a different channel than audio call 130, for instance as further illustrated below in reference to FIG. 4. As a non-limiting example, additional field 135 at first device 100 may include a pop up, such as a "toaster popup" or display on first device 100.

Still referring to FIG. 3, server 200 may cause first device 100 to display logo, for instance in additional field 135. Logo may include a logo selected by the app user to indicate that the call is being forwarded from a specific phone number, as described above. Thus, logo may inform a recipient using first device 100 that incoming call is being forwarded rather than originally being placed to the first device 100; logo may further indicate which device originated the call and/or information regarding device 700 such as a company associated with the device 700 or the like. Such information may be important to help the recipient decide how to answer the incoming call and/or whether to answer the incoming call. Likewise, information 125 may inform the recipient concerning the identity of the caller. Such information may also be important to help the recipient decide how to answer the incoming call and/or whether to answer the incoming call. In an embodiment, logo and/or information is transmitted to first device 100 and/or recipient device by server; transmission may be performed by any means for data transmission from first device 100 to server, including without limitation transmission over a network such as the Internet, transmission via text messaging services, or any other suitable electronic communication. Alternatively or additionally, server 200 may transmit to first device 100 and/or recipient device a caller ID code; caller ID code, as used herein, may be a datum usable to retrieve information 125 and/or data to be displayed in additional field 135 at first device 100 and/or recipient device. For example, and without limitation, caller ID code may be a datum such as retrieval key, identifier, or the like which identifies a record stored at first device 100 and/or recipient device, or at a remote device such as server 200 in communication with first device 100 and/or recipient device, permitting retrieval; for instance, information 125 and/or data to be displayed in additional field 135 may be stored in a key-value data store, hash table, or the like, permitting lookup of information 125 using caller ID code. Caller ID code may alternatively or additionally be a data element containing information 125 and/or data to be displayed in additional field 135, or may be included in, stored with, and/or transmitted with information 125 and/or data to be displayed in additional field 135. Caller ID code may be information 125. Transmission of information 125 and/or data to be displayed in additional field 135 and/or caller ID code may be effected by a different channel than PSTN call to first device 100 and/or recipient device 300; caller ID code, information 125 and/or data to be displayed in additional field 135 may be included in PSTN call to first device and/or recipient device. Caller ID code may include a first portion sent via PSTN and a second portion sent via a different channel such as a text messaging service and/or packet-based network as described above.

Still referring to FIG. 3, information 125 and/or data to be displayed in additional field 135 may be provided from a contact list stored on a database 250 on or connected to the server 200; database may include, without limitation, a contacts database, wherein a predetermined contact associated with second device may be stored in the contacts database; predetermined contact may include an identifier that indicates that the audio call is being forwarded through server 200. Contact list may be created by importing a contact list native to first device 100; the imported contact list may be copied into the application creating a duplicate contact list. Duplicate contact list may add an indicator 126 (best shown in FIGS. 5 and 6) that indicates to the recipient of the call that the call is being forwarded through an app, which may include without limitation an app as described above in reference to FIGS. 1 and 2, on the first device 100. For example, indicator 126 may include an abbreviation of a name of application and/or app, and/or an abbreviation of a company or other entity name of an entity offering the service. Appended indicator 126 may also be used to differentiate between native contacts list and app contact list, which both may be stored on the first device 100 and/or on server 200. Information 125 and/or data to be displayed in additional field 135 may alternatively or additionally include any form of caller ID as described above in reference to FIGS. 1 and 2. It should be noted that call 310, 710 may be placed using any combination of steps for placement of call 110 as described above in reference to FIGS. 1 and 2; for instance, second device 300 may call using app as described above in reference to FIGS. 1 and 2 when placing call 310, in which case server 200 may include in information 125 caller ID associated with second device as described above in reference to FIGS. 1 and 2, which caller ID may be provided via an instance of app that is operating on second device 300. It should be noted as well that call forwarding using system 3000 may be performed after placement of call from first device 100 to second device 300 as described above in reference to FIGS. 1 and 2; forwarding number may, for instance, be first telephone number of first device 100, and number of device at location 700 may be second telephone number which is substituted for first telephone number, such that second device 300 is placing call 310 to a number provided to second device 300 using audio call 110 as described above in reference to FIGS. 1 and 2. Persons skilled in the art, upon reviewing the entirety of this disclosure, will be aware of various other ways in which individual method steps performed by systems 1000, 2000, and 3000 and/or components, devices, modules, or elements of systems 1000, 2000, and 3000 may be combined; all such combinations are contemplated as within the scope of this disclosure. The number, size, shape, and/or configuration of the first device 100, server 200, and/or the second device 300 are shown in FIG. 3 for illustrative purposes only and may be varied depending on the application as would be appreciated by one of ordinary skill in the art having the benefit of this disclosure. For example, the system 3000 may include one or more servers 200. Information 125 and/or logo may be provided from server 200 to first device 100 using any data channel or channels as described above in reference to FIGS. 1 and 2, including transmission over a network 600 and/or text messaging service 500.

With continued reference to FIG. 3, server 200 may cause additional field 135 at first device 100 to show the name and/or phone number of originating calling device 300 that has called device 700 and/or a number associated with device 700, and/or may cause first device 100 to display identifying information of device 700, including but not limited to name and caller ID associated with device 700; in other words, any information in server call data. Server 200 may cause display of information 125 to include any server call data, including without limitation the name and/or phone number of originating calling device 300 that has called device 700 and/or a number associated with device 700, and/or may cause first device 100 to display identifying information of device 700, including but not limited to name and caller ID associated with device 700. For instance, in an embodiment, server 200 may send in audio call 130 and via PSTN call information describing originating device 300, to be displayed as information 125, and may send via a different channel such as network or text messaging services call information based on third telephone number, such as without limitation call information describing device 700, to be displayed in additional field 135. As another non-limiting example, server 200 may send in audio call 130 and via PSTN call information based on third telephone number, such as without limitation call information describing device 700, to be displayed as information 125, and may send via a different channel such as network or text messaging services call information describing originating device 300, to be displayed in additional field 135. Thus, either originating call information or call information associated with third telephone number and device 700 may be provided in either information 125 or additional field 135, depending on implementation; a user of first device 100 may enter an instruction specifying where each category of information is to be displayed. Display of information 125 and/or of additional field 135 may remain in place while incoming call from PSTN 400 is received and displayed on device 100 via display, which may be the native call receiving technology/ display of device 100. Display may show incoming call information sent with inbound call from PSTN 400 that was forwarded to first device 100. Incoming call information may include name/caller ID or other information associated with device 700, and/or it may display name/number or other information about device 300. First device 100 may display information 125, additional display 135, logo, and/or PSTN call information before call is answered informing recipient of the individual and/or device 300 who originally placed the call and the fact that the call was forward through a secondary number of device 700.

Figure 4:
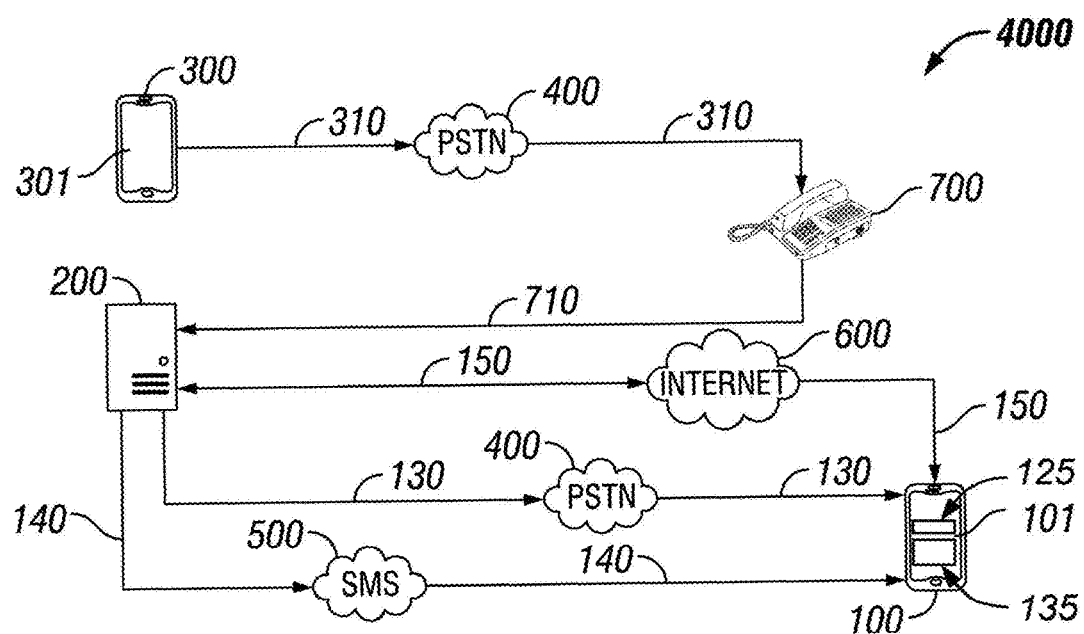
FIG. 4 shows a schematic of one embodiment of a system of the present disclosure for an inbound phone call forwarded from a different telephone number.

FIG. 4 shows a system 4000 for forwarding a telephone number. System 4000 of FIG. 4 is similar to system 3000 of FIG. 3. As such, a call 310 may be placed via PSTN 400 by a second device 300, which may be any second device as described above in reference to FIG. 3, to a device at a location 700, which may be any device at location 700 as described above in reference to FIG. 3, including without limitation an office or home device located at or identified by an office or home telephone number. Call 310 may be forwarded 710 via a first forwarding number to a server 200 as described above in reference to FIG. 3; forwarding may be performed as described above in reference to FIG. 3. Server 200 assigns, or has assigned, first forwarding number to a user account and/or first device 100 and may further have assigned forwarding number to device at location 700; this may be performed, without limitation, as described above in reference to FIG. 3. Server 200 may also correspond first forwarding number to an application, which may include without limitation any app or other application as described above, running on a first device 100, which may include without limitation any first device 100 as described above in reference to FIGS. 1-2, including without limitation a personal mobile phone of a subscriber to application running on server 200. Server 200 may further generate server call data as described above in reference to FIG. 3, by retrieving data using first forwarding number and/or receiving data as part of call 710. Based on first forwarding number, an audio call 130 via the PSTN 400 connects second device 300 to first device 100. Upon receipt of audio call 130, first device 100 may request information 150, such as caller ID and/or contact information, from the server 200 via a network such as the Internet 600; alternatively or additionally, upon receipt of the audio call 130, the first device 100 may also, or instead, request information 140, such as caller ID and/or contact information, from the server 200 via a text messaging service as described above in reference to FIGS. 1 and 2, including without limitation SMS 500. Alternatively or additionally, data to be displayed in additional field 135 and/or logo, and/or data usable to retrieve such data and/or logo at first device 100 as described above in reference to FIG. 3 may be transmitted via network 600 and/or text messaging service 500 from server 200 to first device 100; data to be displayed as information 125, and/or data usable by first device 100 to retrieve information 125, may be transmitted via PSTN. Information 140, 150 may be displayed on the screen, or display, 101 on the first device 100, for instance on additional field 135. Alternatively or additionally, server 200 may cause first device 100 to display a logo that informs a recipient that incoming call is being forwarded rather than originally being placed to the first device 100 as discussed herein. Persons skilled in the art, upon reviewing the entirety of this disclosure, will be aware of various other ways in which individual method steps performed by systems 1000, 2000, 3000, and/or 4000 and/or components, devices, modules, or elements of systems 1000, 2000, 3000, and/or 4000 may be combined; all such combinations are contemplated as within the scope of this disclosure. The number, size, shape, and/or configuration of the first device 100, server 200, and/or the second device 300 are shown in FIG. 4 for illustrative purposes only and may be varied depending on the application as would be appreciated by one of ordinary skill in the art having the benefit of this disclosure. For example, the system 4000 may include one or more servers 200.

Figure 5:
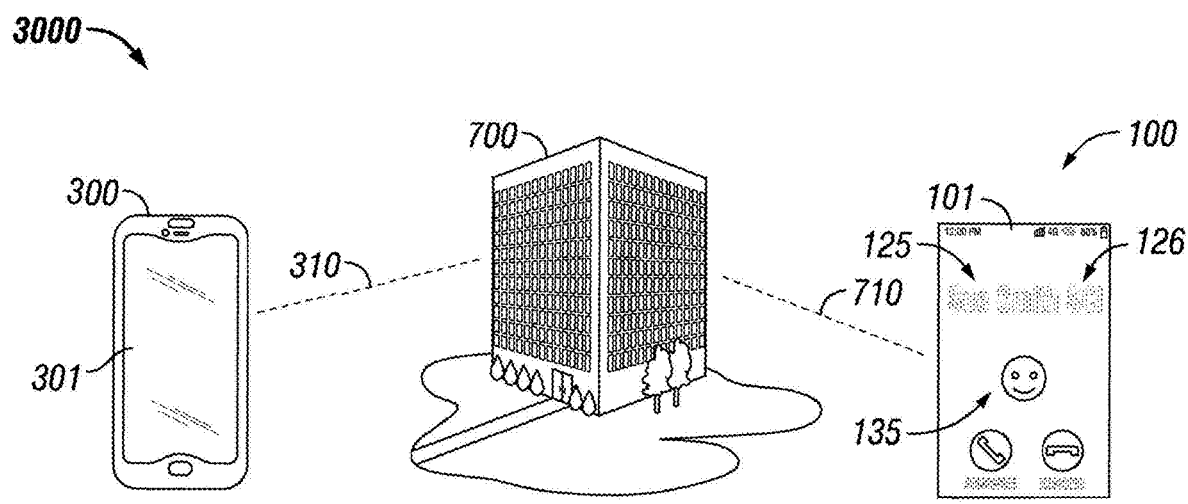
FIG. 5 shows a schematic of one embodiment of a system of the present disclosure for an inbound phone call forwarded from a different telephone number.

FIG. 5 shows a schematic a system 3000 for an inbound phone call 710 to be forwarded from a different telephone number. A second device 300, which may include any second device 300 as described above in reference to FIGS. 3 and 4 having a screen and/or display 101 places a call 301 to a phone number of a device at a location 700, which may include any device at location 700 as described above; this may be implemented, without limitation, as described above in reference to FIGS. 3 and 4. As discussed herein, a call 710 is forwarded to a first device 100; this may be implemented, without limitation, as described above in reference to FIGS. 3 and 4. System 3000 provides for screen 101 and/or display of first device 100 to display data, which may include a first logo, and which may be is associated with a phone number at location 700; this may be implemented, without limitation, as described above in reference to FIGS. 3 and 4. The system 3000 also provides for the screen 101 and/or display of the first device 100 to display information 125, as described above, which may include information related to the second device 300; this may be implemented, without limitation, as described above in reference to FIGS. 3 and 4. For example, information 125 may include a contact name or caller ID associated with the second device 300; any other example as described above in reference to FIGS. 3-4 is likewise contemplated here. System 3000 also may provide for screen 101 and/or of first device 100 to display an indicator 126 that further indicates that a call is being forwarded rather being initially placed to the first device 100; this may be implemented, without limitation, as described above in reference to FIGS. 3 and 4. Recipient may then be better informed whether to answer the call and/or how best to answer the call. The size, shape, location, and/or configuration of the caller information, 125, indicator 126, and/or first logo are shown in FIG. 5 for illustrative purposes and may be varied depending on the application as would be appreciated by one of ordinary skill in the art having the benefit of this disclosure.

Figure 6:
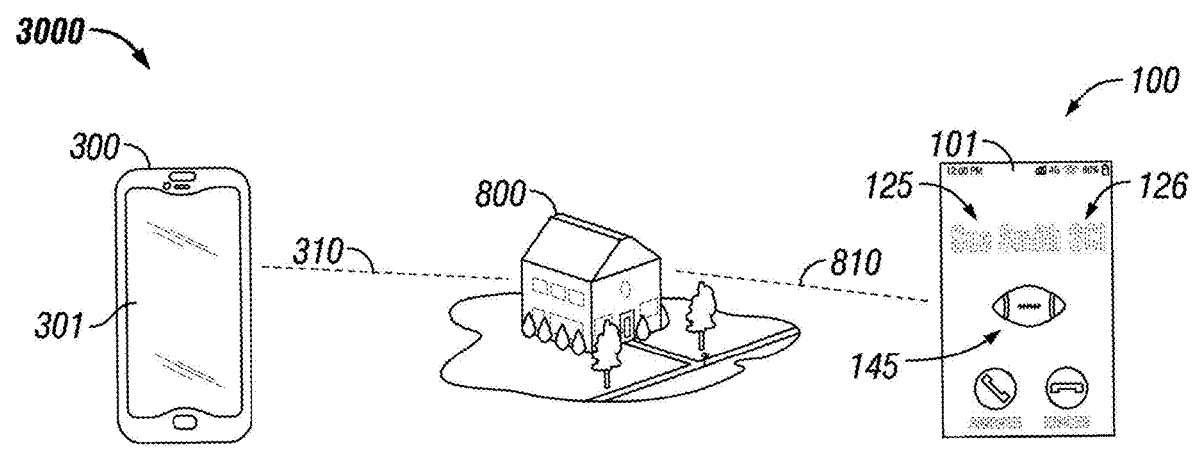
FIG. 6 shows a schematic of one embodiment of a system of the present disclosure for an inbound phone call forwarded from a different telephone number.

FIG. 6 shows a schematic a system 3000 for an inbound phone call 710 to be forwarded from a different telephone number. A second device 300, which may include any second device 300 as described above, having a screen, or display, 301 places a call 301 to a number at a location 800 that differs from the number and location 700 of FIG. 5; this may be implemented, without limitation, as described above in reference to FIGS. 3 and 4. As discussed herein, a second forwarding number associated with the phone number at the location 800 may forward call 810 to first device 100 via server 200; this may be implemented, without limitation, as described above in reference to FIGS. 3 and 4. System 3000 may provide for any display of any information as described above in reference to FIGS. 3-4, including display of a second logo 145, which may, without limitation, be associated with a phone number at second location 800; this may be implemented, without limitation, as described above in reference to FIGS. 3 and 4. System 3000 also provides for the screen 101 of the first device 100 to display information 125 as described above, which may include without limitation related to second device 300 and/or location 800; this may be implemented, without limitation, as described above in reference to FIGS. 3 and 4. For example, information 125 may include a contact name or caller ID associated with second device 300. System 3000 may also provide for screen and/or display 101 of first device 100 to display an indicator 126 that further indicates that the call is being forwarded rather than being initially placed to the first device 100; this may be implemented, without limitation, as described above in reference to FIGS. 3 and 4. A recipient may then be better informed whether to answer the call and/or how best to answer the call. Size, shape, location, and/or configuration of the caller information, 125, indicator 126, and/or second logo 145 are shown in FIG. 6 for illustrative purposes and may be varied depending on the application as would be appreciated by one of ordinary skill in the art having the benefit of this disclosure.

Figure 9:
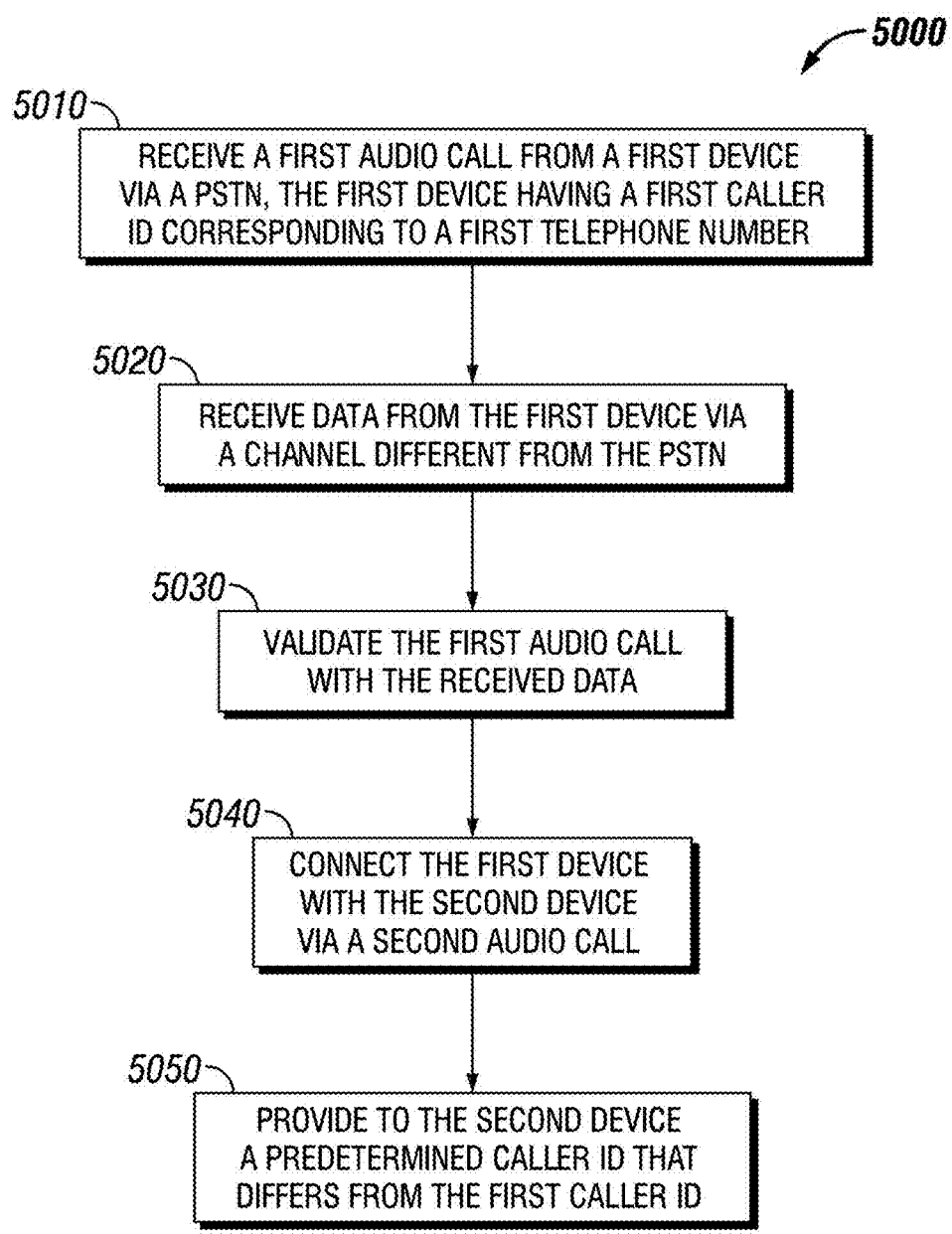
FIG. 9 is a flow chart of an embodiment of a method disclosed herein.

FIG. 9 is a flow chart of an embodiment of a method 5000 for providing a predetermined caller ID. The method 5000 includes receiving a first audio call from a first device via a PSTN, the first device having a first caller ID corresponding to a first telephone number, at 5010; this may be implemented, without limitation, as described above in reference to FIGS. 1 and 2. For example, server 200, as described above in reference to FIGS. 1-6, may receive an audio call 110, as described above in reference to FIGS. 1-2, via PSTN 400 as described above in reference to FIGS. 1-2, from a first device 100 as described above in reference to FIGS. 1-2. Method 5000 includes receiving data from the first device via a channel different from the PSTN, at 5020; this may be implemented, without limitation, as described above in reference to FIGS. 1 and 2. For example, server 200 may receive data 120 via SMS 500 or via the Internet 600, for instance as described above in reference to FIGS. 1 and 2. Receiving data may include receiving a telephone number associated with the first destination device and the predetermined caller ID. Receiving data may include receiving a username and a password.

Still referring to FIG. 9, method 5000 includes validating the first audio call with received data, at 5030; this may be implemented, without limitation, as described above in reference to FIGS. 1 and 2. For example, server 200 may use data 120 from first device 100 to validate audio call 110 from the first device 100, for instance as described above in reference to FIGS. 1 and 2. Method 5000 includes connecting the first device with the second device via a second audio call, at 5040; this may be implemented, without limitation, as described above in reference to FIGS. 1 and 2. For example, after server 200 validates first audio call 110 from first device 100, the server may connect the first device 100 with second device 300 using a second audio call 210 via PSTN 400, for instance as described above in reference to FIGS. 1 and 2. Method 5000 includes providing the second device a predetermined caller ID that differs from the first caller ID, at 5050; this may be implemented, without limitation, as described above in reference to FIGS. 1 and 2. For example, first device 100 may have a first caller ID and server 200 may causes a screen 301 of second device 300 to display a predetermined caller ID 225 that differs from first caller ID, for instance as described above in reference to FIGS. 1 and 2.

Figure 10:
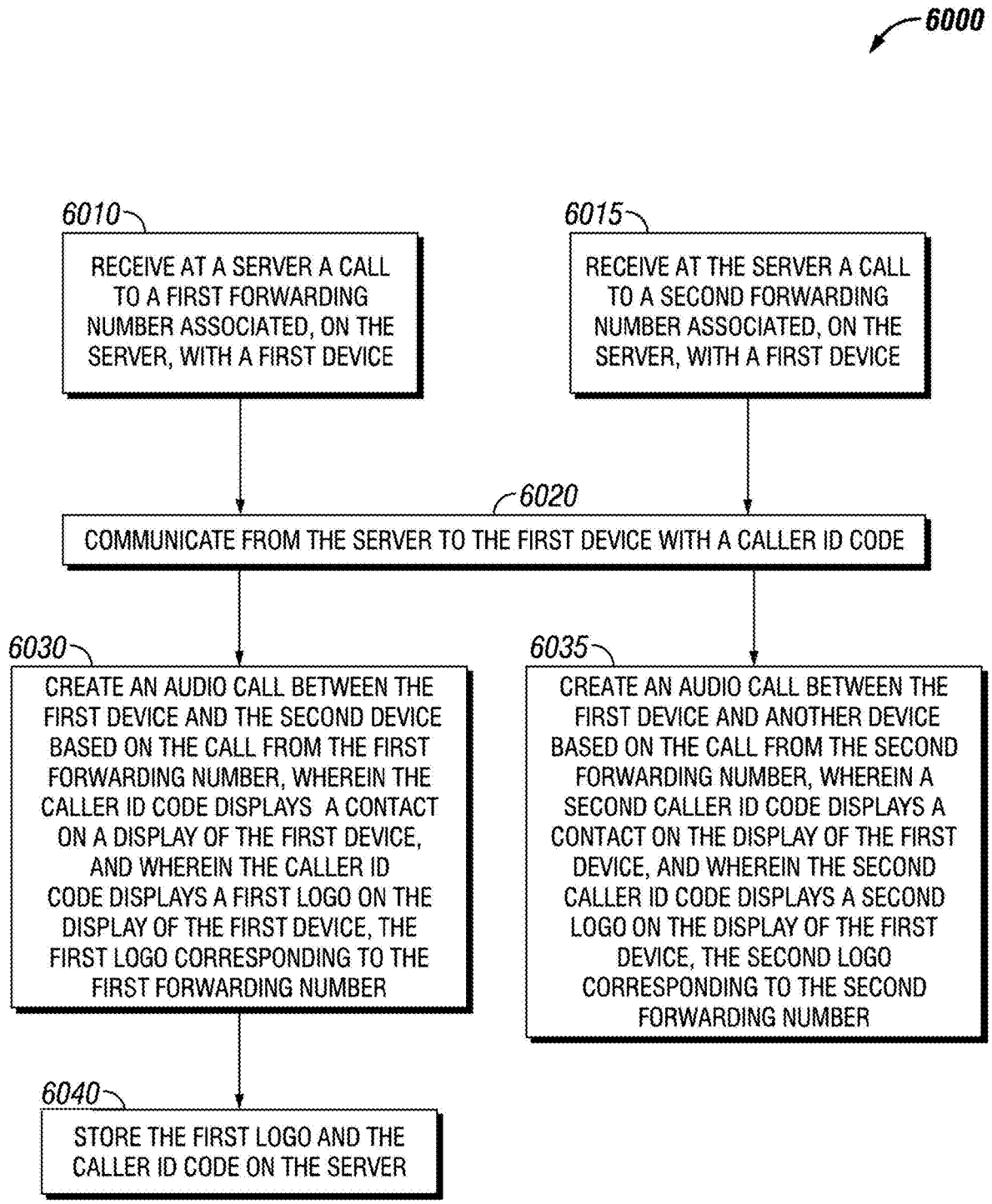
FIG. 10 is a flow chart of an embodiment of a method disclosed herein.

FIG. 10 is a flow chart of an embodiment of a method 6000 for forwarding a telephone call. Method 6000 includes receiving at a server a call to a first forwarding number associated, on the server, with a first device, at 6010; this may be implemented, without limitation, as described above in reference to FIGS. 3-6. For example, a server 200 may receive a call 710 to a first forwarding number associated with a first device 100, for instance as described above in reference to FIGS. 3-6. Method 6000 includes communicating from the server to the first device with a caller ID code, at 6020; this may be implemented, without limitation, as described above in reference to FIGS. 3-6. For example, server 200 may communicate a contact or caller ID related to the call, for instance as described above in reference to FIGS. 3-6. Method 6000 includes creating an audio call between the first device and a second device based on the call from the first forwarding number, wherein the caller ID code displays a contact on a display of the first device, and wherein the caller ID code displays a first logo on the display of the first device, the first logo corresponding to the first forwarding number, at 6030; this may be implemented, without limitation, as described above in reference to FIGS. 3-6. For example, server 200 may create an audio call between first device 100 and a second device 300, for instance as described above in reference to FIGS. 3-6. Audio call may be made, without limitation, over PSTN 400. Caller ID code may cause a screen and/or or display 101 of first device 100 to display a caller information 125, for instance as described above in reference to FIGS. 3-6. Caller ID code may cause screen and/or display, 101 of first device 100 to display a first logo, for instance as described above in reference to FIGS. 3-6. First logo may correspond to a first location 700 or, more specifically, a telephone number at the first location 700, for instance as described above in reference to FIGS. 3-6. Method 6000 may include displaying, or causing to be displayed, a notification on display 101 of first device 101 prior to creating the audio call between the first device 100 and second device 300; the notification may include caller ID information regarding the second device. Telephone number at first location does not necessarily need to be stationary; for example, the telephone number may correspond to a mobile phone as would be appreciated by one of ordinary skill in the art having the benefit of this disclosure.

Still referring to FIG. 10, method 6000 may include storing the first logo and the caller ID code on the server, at 6040; this may be implemented, without limitation, as described above in reference to FIGS. 3-6. For example, first logo and the caller ID code may be stored in a database 250 on server 200, for instance as described above in reference to FIGS. 3-6. Method 6000 may include receiving at the server a call from a second forwarding number associated, on the server, with the first device, at 6015; this may be implemented, without limitation, as described above in reference to FIGS. 3-6. For example, server 200 may receive a call 810 from a second forwarding number associated with first device 100, for instance as described above in reference to FIGS. 3-6. Method 6000 includes communicating from server to first device with a caller ID code, at 6020; this may be implemented, without limitation, as described above in reference to FIGS. 3-6. For example, server 200 may communicate a contact or caller ID related to the call, for instance as described above in reference to FIGS. 3-6. Method 6000 includes creating an audio call between first device and another device based on call from second forwarding number; a second caller ID code displaying a contact on the display of the first device may be included wherein the second caller ID code may display a second logo on display of the first device, the second logo corresponding to the second forwarding number, at 6035; this may be implemented, without limitation, as described above in reference to FIGS. 3-6. For example, the server 200 may create an audio call between first device 100 and another device, which may be second device 300, for instance as described above in reference to FIGS. 3-6. Caller ID code may cause screen and/or display, 101 of first device 100 to display caller information 125, which may be a contact, for instance as described above in reference to FIGS. 3-6. Caller ID code may cause screen and/or display 101 of first device 100 to display a second logo 145, for instance as described above in reference to FIGS. 3-6. Second logo 145 may correspond to a second location 800 or, more specifically, a telephone number at second location 800, for instance as described above in reference to FIGS. 3-6. Telephone number at the second location does not necessarily need to be stationary. For example, telephone number may correspond to a mobile phone as would be appreciated by one of ordinary skill in the art having the benefit of this disclosure.

Figure 11B:
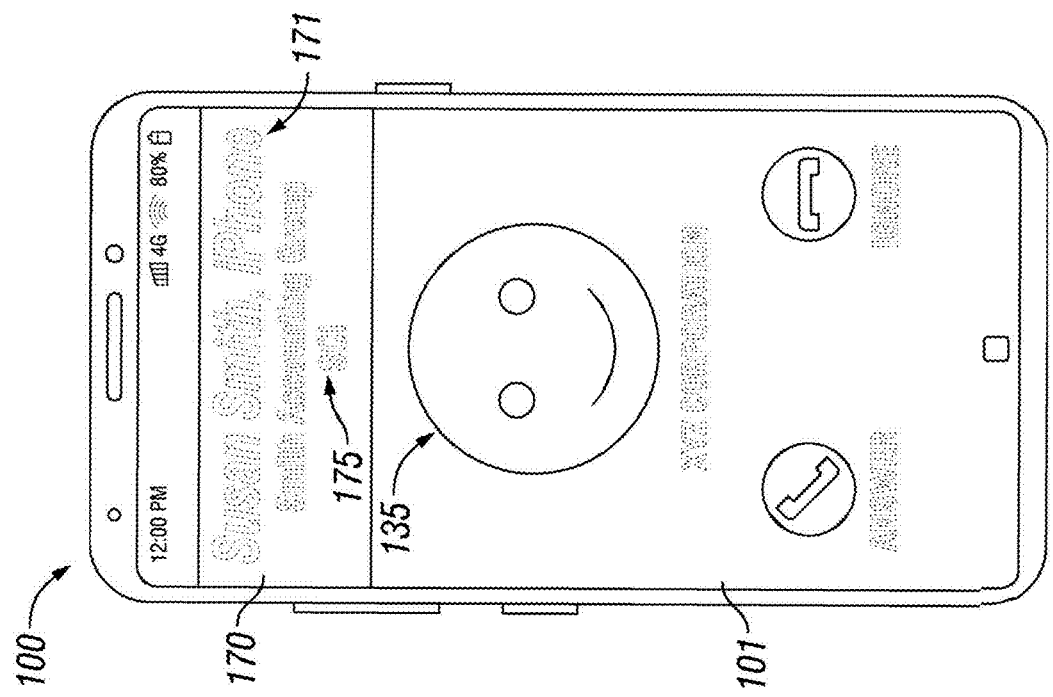
FIG. 11B shows a schematic of a device receiving a forwarded call.
Figure 11A:
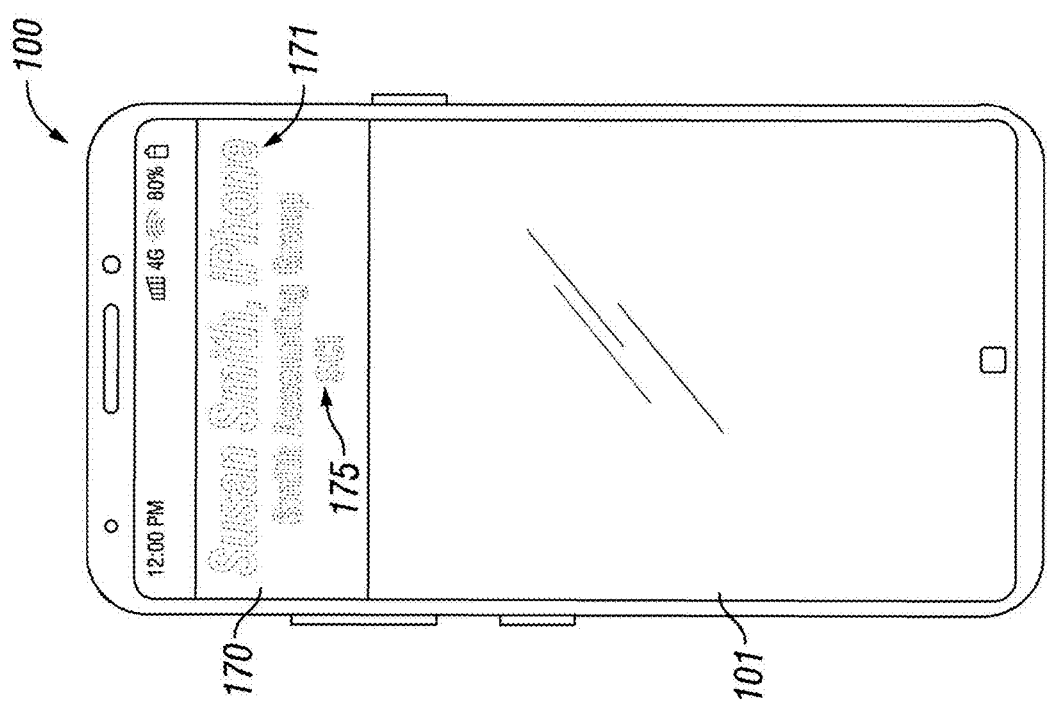
FIG. 11A shows a schematic of a device receiving a notification of incoming forwarded call to be received shortly.

FIG. 11A shows a schematic of a device 100 receiving a notification 170 on a screen and/or display 101 of a device 100 such as without limitation first device 100 as described above in reference to FIGS. 1-6. Notification 170 may be received according to any method or method steps as described above. Notification 170 may be displayed as information 125 as described above in reference to FIGS. 3 and 4. Notification 170 may indicate an incoming forwarded call to be received shortly. The notification 170 may, as a non-limiting example, indicate an identification 171 of the caller, who may include the originating caller, and/or information regarding a device 700, 800 or telephone number to which forwarded call was initially directed. The identification 171 may include any information to identify a caller, number, device, or the like, including without limitation a contact name and/or caller ID. The notification 170 may also include an indicator 175 that the call to be received is being forwarded through an application on the device 100. The notification 170 may be displayed, as a non-limiting example, as a banner located on the upper portion of the screen 101. The location, size, and/or configuration of the notification 170 is shown in FIG. 11A for illustrative purposes and may be varied depending on the application as would be appreciated by one of ordinary skill in the art having the benefit of this disclosure.

FIG. 11B shows a schematic of a device 100 receiving an incoming forward call with the notification 170 remaining on a screen and/or display 101 of a device 100 such as without limitation first device 100 as described above in reference to FIGS. 1-6. Device 100 and/or display 101 may include an additional field 135; additional field 135 may display any information as described above in reference to FIGS. 3-4, including without limitation a logo, a company or entity name, or the like. As discussed herein, logo may be assigned to a specific forwarding number and thus, indicate the recipient the telephone number and/or device the call is being forwarded from; for instance, and without limitation, logo may be associated with a business or other enterprise with whom the recipient may be affiliated, and at whom device 700 or 800 may be located. The notification 170 and the logo may provide that the recipient is better informed on how to and/or whether to answer the incoming call. Location, size, and/or configuration of the logo is shown in FIG. 11B for illustrative purposes and may be varied depending on the application as would be appreciated by one of ordinary skill in the art having the benefit of this disclosure. As noted above in reference to FIGS. 3-4, any information that is or may be included in server call data may be included in either of information 125 or additional field 135; for instance, and as a further non-limiting example, caller identification associated with an originating caller may be displayed in additional field 135 while information concerning number or device from which call is forwarded may be displayed as information 125.

Further referring to FIG. 11B, display elements may include at least an option provided to a user of device, such as without limitation, at least a option that the user may select by pressing a button or otherwise activating an event handler associated with a graphical user interface. Options may include without limitation options to accept an incoming call, which may for example be associated with an "Accept" button or equivalent. Options may include options to send an incoming call to voicemail, which may for instance be associated with a "Send to Office VM" and/or "Send to VM" button or equivalent, and which may send to any preconfigured voicemail account and/or any voicemail account specified by further user inputs. Options may include an option to forward a call such as an incoming call, which may for instance be associated with a "Forward Call" button or equivalent, and which may be activated during initial reception of call and/or at any time while a call is active; call forwarding may be accomplished by any call forwarding process, including without limitation any process, process step, and/or combination thereof as described in this disclosure for call forwarding. Options may include an option to create a conference call, which may be associated, for instance, with a "Create Conference Call" button, and which may be activated during initial reception of call and/or at any time while a call is active; a conference call may be generated by merging any two or more calls, each of which may be initiated, prior to, after, and/or as a result of selecting this option, in any manner for initiation of calls, including without limitation any process, process step, and/or combination thereof as described in this disclosure for initiation, placement, connection, forwarding, and/or otherwise enabling phone calls. Options may include an option to join a call, which may be associated, without limitation, with a "Join Call" button; this option may be provided, for instance, to two or more telephones and/or telephonically enabled devices such as, without limitation, a device of a secondary recipient, such as a co-worker, supervisor, assistant, or the like of a person initially receiving a call, which secondary recipient may receive a notification via a mobile application or other technology described in this disclosure that the person initially receiving the call is receiving, has joined, and/or has performed any other action as described in this disclosure with the call. Thus, for instance, secondary recipient may join any call answered by primary recipient by selecting a "Join Call" option, causing initiation and/or conferencing of a second call with the call according to any process, process step, and/or combination thereof as described in this disclosure; initial recipient may remain on the call and/or may have call terminated, and/or initial recipient may receive, on a display, a notification that secondary recipient has joined the call. Notifications of incoming calls, with any of the options described above, may be transmitted to two or more devices, including without limitation primary and/or secondary recipients, or multiple potential recipients as described in further detail in this disclosure.

Figure 12:
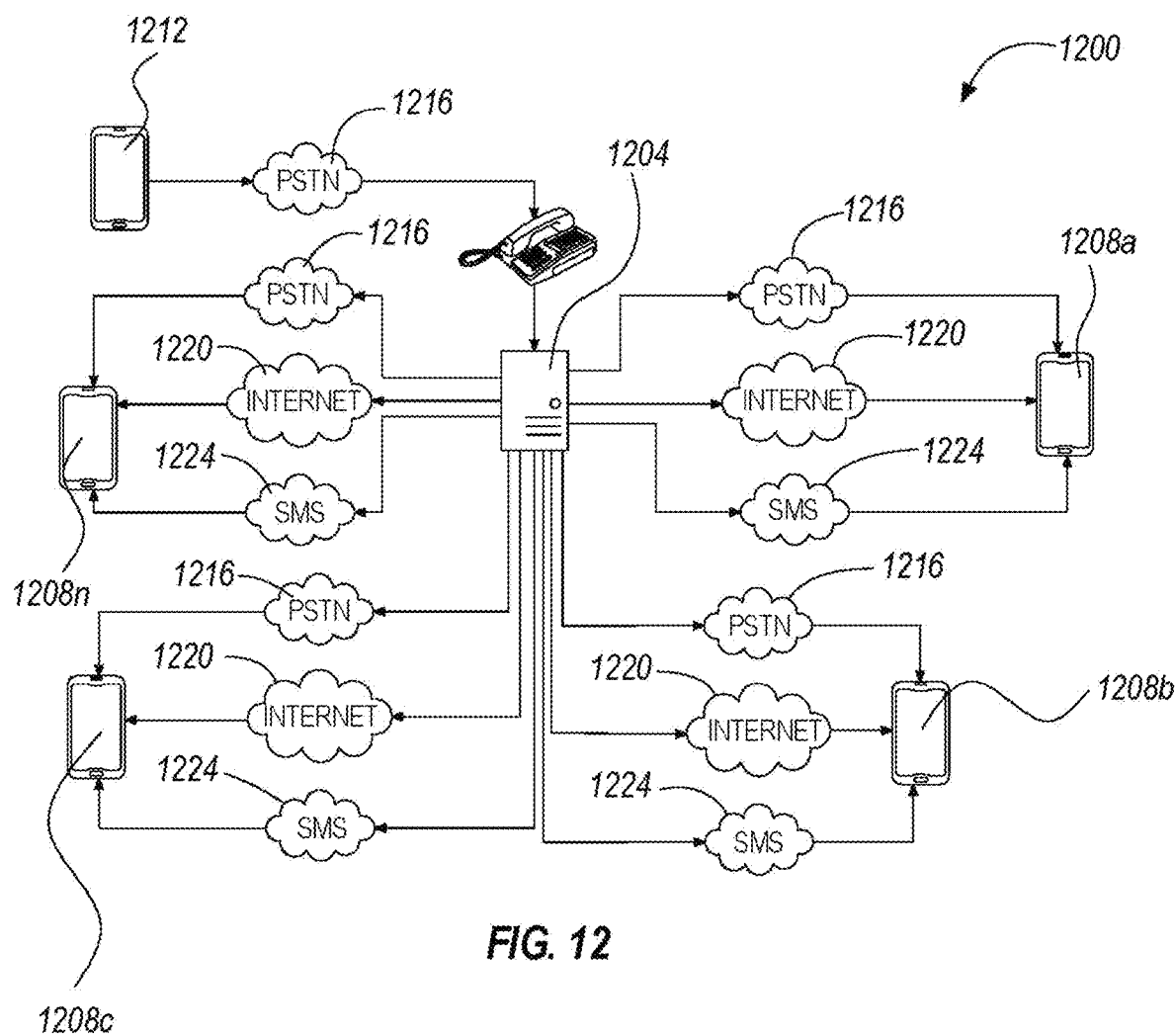
FIG. 12 shows a schematic diagram of one embodiment of a system of the present disclosure for an inbound phone call forwarded from a different telephone number to multiple telephones.

Turning now to FIG. 12, an exemplary embodiment of a system 1200 for providing call forwarding over a publicly switched telephone network. Elements of system 1200 may be implemented in any manner suitable for implementation of elements of systems 1000, 2000, 3000, and/or 4000; similarly, elements of systems 1000, 2000, 3000, and/or 4000 may be implemented in any manner suitable for implementation of system 1200. System 1200 includes a server 1204. Server 1204 may include any computing device and/or combination of computing devices as described in this disclosure, including without limitation any device suitable for use as a server as described in this disclosure. Server 1204 may connect to a plurality of recipient devices 1208*a-n*; each of plurality of recipient devices 1208*a-n* may include, without limitation, any recipient device as described in this disclosure. Server may connect to at least a second device 1212 having a second telephone number; at least a second device 1212 may be implemented, without limitation, in any manner suitable for implementation of a second device as described above in reference to FIG. 4.

Server 1204 may communicate with any of second device 1212 and/or plurality of recipient devices 1208*a-n* by way of any suitable protocol for electronic communication as described above in reference to FIGS. 1-11B. For instance, and without limitation, server 1204 may communicate with of second device 1212 and/or plurality of recipient devices 1208*a-n* via a PSTN 1216, which may be implemented as described above in reference to FIGS. 1-11B. As a further non-limiting example, server 1204 may communicate with of second device 1212 and/or plurality of recipient devices 1208*a-n* via a text-messaging service and/or protocol, such as without limitation SMS 1220, which may be implemented as described above in reference to FIGS. 1-11B. As an additional non-limiting example, server 1204 may communicate with of second device 1212 and/or plurality of recipient devices 1208*a-n* via a network connection such as the Internet 1224, which may be implemented as described above in reference to FIGS. 1-11B.

In an embodiment, server 1204 is designed and configured to perform call forwarding between at least a recipient device having a display and a recipient telephone number and a second device having a second telephone number, for instance as described below in reference to FIG. 13.

Figure 13:
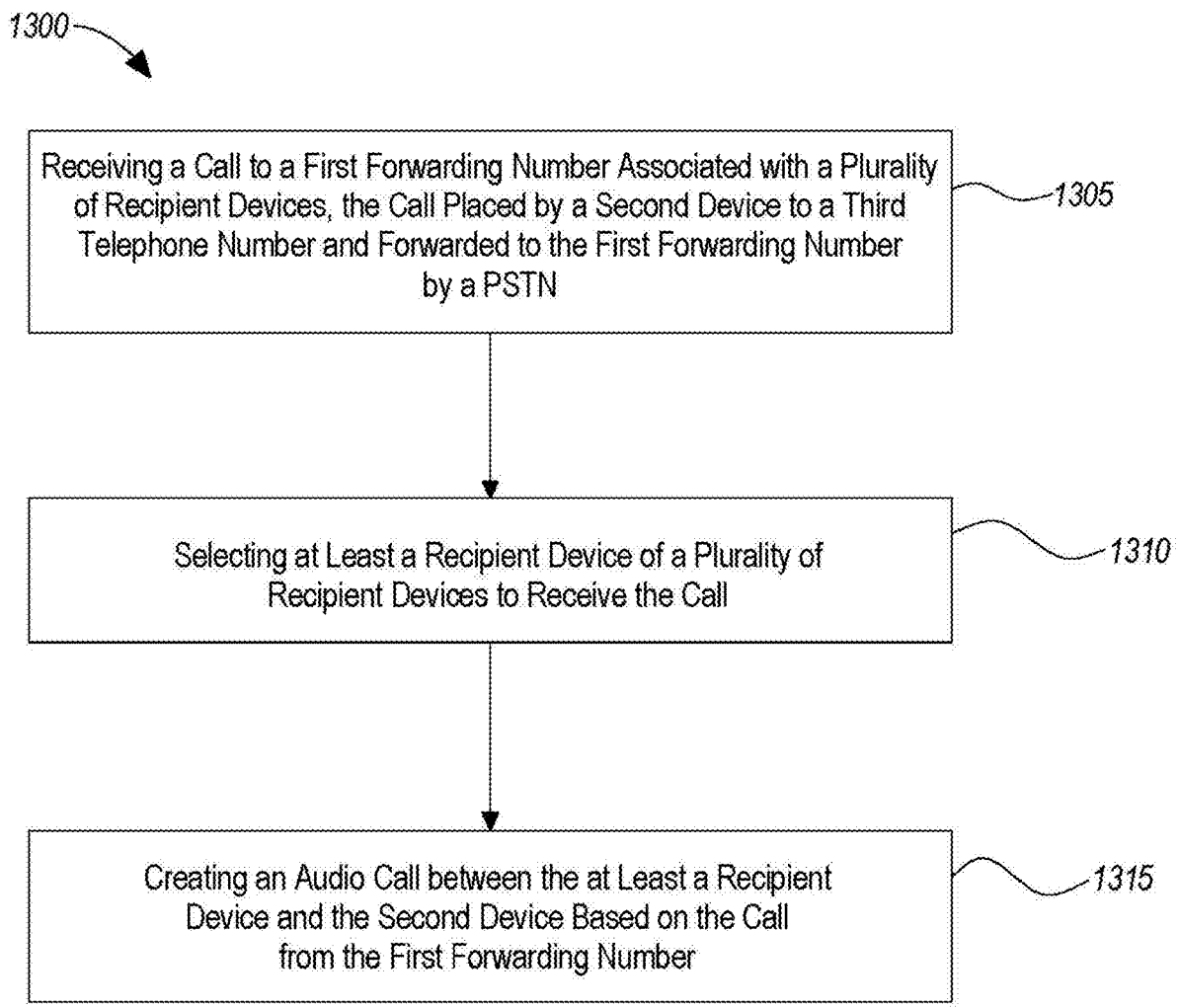
FIG. 13 is a flow diagram of one embodiment of a method of the present disclosure for an inbound phone call forwarded from a different telephone number to multiple telephones.

Turning now to FIG. 13, an exemplary embodiment of a method 1300 of providing call forwarding over a publicly switched telephone network is illustrated. At step 1305, a server 1204 receives a call to a first forwarding number, the first forwarding number associated, on the server, with a plurality of recipient devices 1208*a-n*, wherein the call is placed by a second device 1212 to a third telephone number and forwarded to the first forwarding number by a publicly switched telephone network (PSTN). This may be accomplished, without limitation, according to any methods and/or method steps as disclosed above in reference to FIGS. 1-11B. Call may be placed using any suitable method and/or methods for placement of calls, including without limitation any method for call placement as described above in reference to FIGS. 1-11B.

At step 1310, and still referring to FIG. 13, server 1204 selects at least a recipient device of a plurality of recipient devices 1208*a-n* to receive the call. Plurality of devices may be associated with first forwarding number in any data structure or using any component and/or element as described above for associating a recipient device with a first forwarding number. In an alternative embodiment, server 1204 may create a call via PSTN 1216 to all devices of plurality of devices 1208*a-n* and connect the call as a conference call any answering devices of plurality of recipient devices 1216; this may be performed by placement of PSTN calls according to any method steps described above for placement of calls via a PSTN 1216 for call forwarding. Selecting the at least a recipient device may include filtering the plurality of recipient devices according to at least a contextual datum. A "contextual datum," as used herein, is any element of data describing a location and/or current status of a user of a recipient device and/or a time and/or date during which the call occurs. A contextual datum may include, without limitation, a time, a date, a vacation status such as whether a particular user is on vacation, a geographical location of a user, for instance as determined using GPS or similar location of a recipient device, or the like. Contextual data may be used to choose between two or more devices operated by one user; for instance, a user whose cell phone conveys data indicating the user is at home may have his or her home phone selected rather than the cell phone. As a further example of a contextual datum being used in selection, a user who is on vacation according to some data provided to the server may get excluded from the call by having the user's recipient device not be selected; such a determination may also depend on additional factors, such as second telephone number, such that a second number associated with an important client and/or supervisor may cause selection of a user's recipient device whether the user is on vacation or not. Embodiments of this method may enable a user, or employer thereof, to establish various selection rules concerning which numbers are forwarded to the user, and under which circumstances, including which numbers should be forwarded to the user outside of work hours, which numbers should be excluded for the user because of interpersonal issues, or the like.

With continued reference to FIG. 13, As a further non-limiting example, one or more devices may by flagged in memory of the server 1204 as not receiving calls after hours; alternatively or additionally, some devices may be designated as "on call" for a given time, date, day of the week, or the like, such that a particular user may receive such calls by default. "Work hours," as used herein, may be any hours of operation of a business, department, office, particular employee, or the like, which may vary depending on a day of the week, calendar day, or other parameter, according to any suitable schedule. A particular user and/or recipient device may be flagged or otherwise indicated in memory of server 1204 as a default and/or lead recipient for forwarding number, and/or forwarding number combined with a second number, a given contextual datum, or the like. Default and/or lead recipient may be selected as the only one called or may ring a couple of times before additional lines are added to the call. Thus, selecting at least a recipient device may include selecting at least a default recipient device.

Still referring to FIG. 1, selecting the at least a recipient device may include communicating from server 1204 to plurality of recipient devices 1208*a-n* with a caller identification (ID) code; this may be performed, without limitation, as described above in reference to FIGS. 1-11B. This may be combined with filtering and/or selection of recipient devices according to contextual data and/or as default devices; thus, server 1204 may communicate a caller identification code to a subset of plurality of devices 1208*a-n* as determined by any filtering or other operations as described above. In an embodiment, a default recipient device may receive communication from server 1204 to of a caller identification (ID) code first; default recipient device and/or a user thereof may thereafter be able to refuse and/or fail to answer, causing server 1204 to send message to a second default recipient device, to a subset of recipient devices selected according to any criteria and/or contextual data as described above, and/or plurality of recipient devices 1208*a-n* minus default device. Default recipient may enter a message specifying a subsequent recipient device, using any user interface options described in this disclosure, and/or a message for a subsequent recipient to read and/or receive. Server 1204 may subsequently receive from at least a responding device of the plurality of recipient devices an indication accepting call; this may be performed according to any procedure and/or procedure step as described above for acceptance of a call by a user of a recipient device. For instance, and without limitation, communicating from server 1204 to plurality of recipient devices 1208*a-n* may include providing, to the plurality of recipient devices, or to a subset determined by any filtering or selection operations as described above, a selectable display field; receiving the selection of the call further comprises receiving a user selection of the selectable field. Server 1204 may select the at least a responding device as the at least a recipient device. As a non-limiting illustrative example, server 1204 may generate an alert that creates a toaster pop-up on each app user's cell phone; he app user can then press the popup to open the app or go directly to the app to open it. Once opened, the app may display key information and provide a simple question to the app user. As a non-limiting example, information displayed to a user may include caller ID and/or name of an originating caller, a company name and/or phone number to which call was originally sent, or the like. An app user may then press YES or NO, or equivalent input options, signaling server 1204 to send the call to their cell phone over the PSTN 1216 as further described below. Communication of codes may be performed via SMS 1220 or other text messaging protocols and/or systems, and/or via a network such as the Internet 1224, for instance as described above in reference to FIGS. 1-11B.

Still referring to FIG. 13, and as noted above, selecting at least a recipient device may include communicating from the server to a default recipient device with a caller identification (ID) code, which may be implemented as described above, receiving, from at least a default recipient device, a user input, and selecting the at least a recipient device based on the user input. User input may include a selection of the at least a recipient device. User input may include a refusal to answer the call. Alternatively or additionally, default user and/or device may fail to respond within a threshold period of time, which may trigger communication and/or call to be transmitted and/or connected to one or more devices of plurality of recipient devices 1208*a-n*. Thus, communication may be staggered: at least a default device may get a first opportunity to respond to call, and either failing to answer, selecting another device, and/or refusing call may cause call to be sent to one other or many other devices. In an embodiment, caller ID code may display a contact on a display of the recipient device; the caller ID code may display a first logo on the display of the recipient device, the first logo corresponding to the first forwarding number. This may be implemented as described above in reference to FIGS. 1-11B. Additional information that may be displayed may include, without limitation, who else is on the call, whether multiple people answered, whether somebody else has conferenced in, or the like, who was initially selected, whether a "default," preferred, or other person was initially tried, failed to answer, refused, or the like, and/or messages entered by other users, including without limitation message entered by a default recipient.

In operation, inbound calls and caller ID information may be forwarded and/or transmitted to one or multiple APP Users at the same time. When forwarded to multiple recipients, a first person/App User/Customer that answers the call may be connected with the inbound caller. In an embodiment, if an inbound call is directed to multiple individuals' cell phones, the person who did NOT answer the call (meaning someone else to whom the call was also forwarded answered first and connected with the caller) may have the ability to go to the APP and conference into the existing phone call. Specifically, other individuals who did not keypress "yes" first may then have the ability go back to the App and keypress "join"; Once "join" is key pressed, such other users' phones and/or other recipient devices may receive a call from server 1204; when answered, an individual who key pressed "join" may be conferenced into an existing call.

In an embodiment, and still referring to FIG. 13, when a call is forwarded to multiple individuals, contact information of the originating caller and the number which was originally dialed may first be displayed on the APP or via a text message, for instance as described above. A PSTN phone call may not be forwarded until an App User keypresses "yes" meaning they want to receive the call; the App User may have the ability to say "yes" or "no" via the APP or via text message. A first person to keypress "yes" may then have the voice portion call forwarded to their cell phone; this may be implemented as described above in reference to FIGS. 1-11B. In an embodiment, a first app user to press "YES" may have the call forwarded via the PSTN to their cell phone; in other words, a first device responding to communication may be selected as described above. All other app users in that distribution list may receive a notice revealing the user who took the call.

At step 1315, and still referring to FIG. 13, server 1204 creates an audio call between the at least a recipient device and the second device 1212 based on the call from the first forwarding number; the call may be placed via PSTN 1216. This may be implemented, without limitation, as described above in reference to FIGS. 1-11B.

Figure 14:
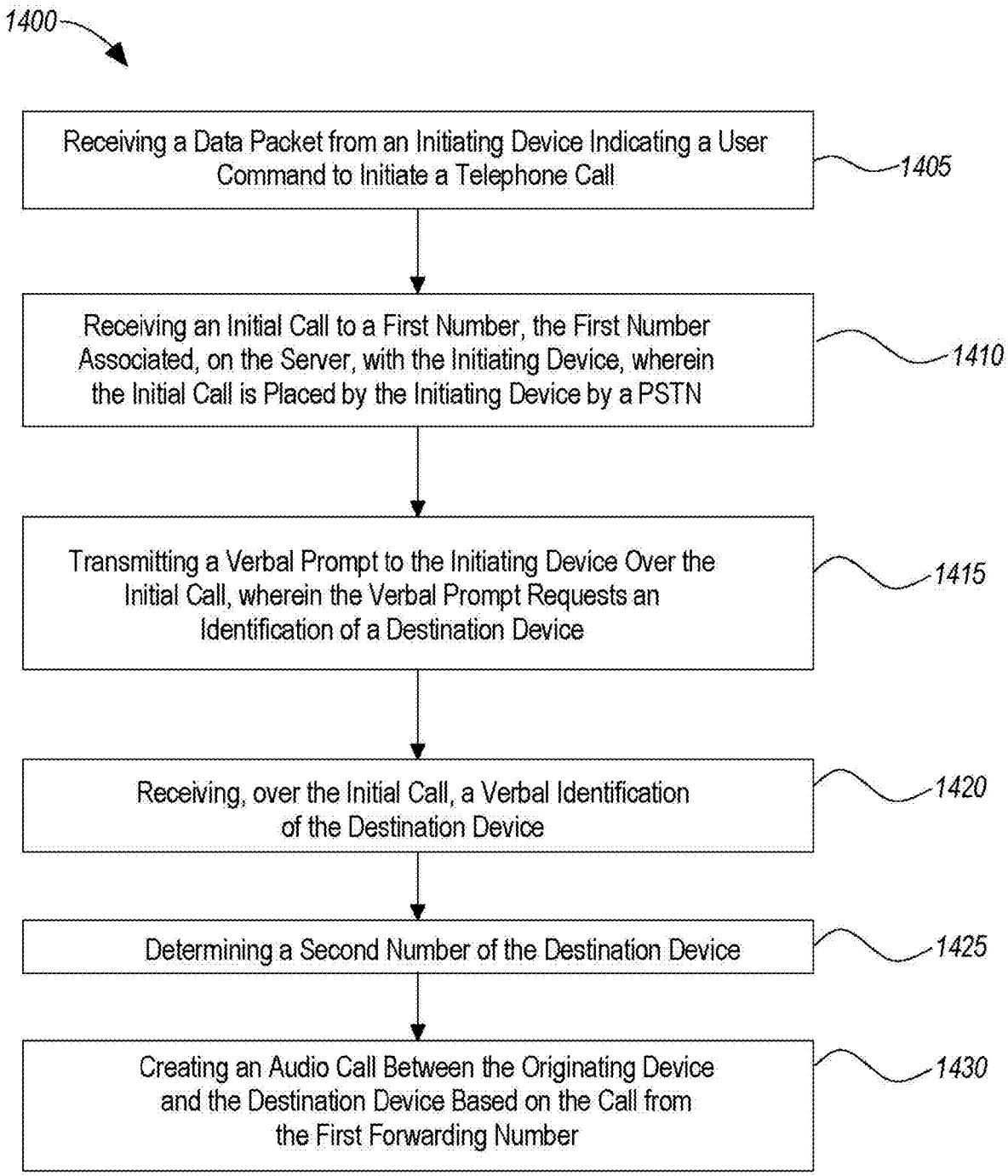
FIG. 14 is a flow diagram of one embodiment of a method of the present disclosure for outbound calling over a public switched telephone network.

Referring now to FIG. 14, an exemplary embodiment of a method 1400 of outbound calling over a public switched telephone network is illustrated. At step 1405, a server, which may include any server as described above in reference to FIGS. 1-13, receives a data packet from an initiating device indicating a user command to initiate a telephone call; this may be implemented, without limitation as described above in reference to FIGS. 1-13. A user of initiating device may initiate call as described above, including without limitation by activating an app on initiating device; app may display a pop up, activation of which transmits the data packet. Data packet may, for instance, notify the server that initiating device is going to make a call within some short period of time, such as without limitation 5 seconds.

Figure 15:
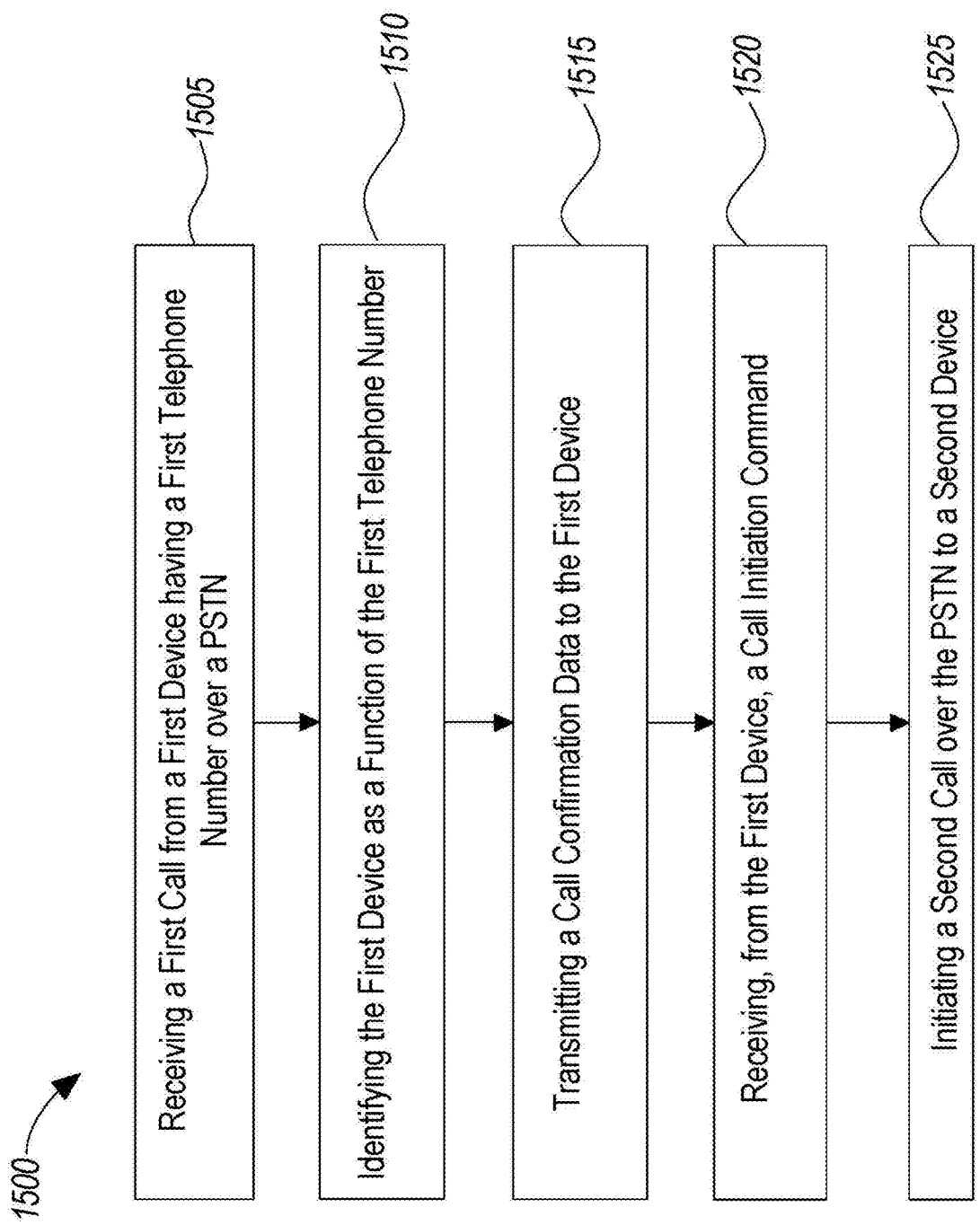
FIG. 15 is a flow diagram of one embodiment of a method of call placement over a publicly switched telephone network.

At step 1410, and still referring to FIG. 15, server may receive an initial call to a first number, the first number associated, on the server, with the initiating device, wherein the initial call is placed by the initiating device by a publicly switched telephone network (PSTN); this may be implemented, without limitation, as described above in reference to FIGS. 1-13. For instance, and without limitation, an app operating on initiating device may trigger a native dialer on the initiating device and call server via a predetermined phone number assigned to that initiating device, for instance over the PSTN. At step 1415 transmitting, by the server, a verbal prompt to the initiating device over the initial call, wherein the verbal prompt requests an identification of a destination device; this may be implemented, without limitation, as described above in reference to FIGS. 1-13. As a non-limiting illustrative example, server may answer with the person's first name, for instance saying, "Hello, Bill. Whom would you like to call? At step 1420, server may receive, over the initial call, a verbal identification of the destination device; this may be implemented, without limitation, as described above in reference to FIGS. 1-13. For instance, an app user may respond with a first and last name of a user of a recipient device, such as "Bill Johnson," which server may retrieve from contacts associated with user of initiating device stored on server and/or on initiating device. Where retrieved contact information includes more than one number and/or recipient device associated with an identified user, server may transmit a follow-up question over the initial call and receive further information from the initiating device via the call and/or data packets sent via text messaging and/or network communication. For instance, server may respond with the following, "Which number, home, cell or office?" to which a user may verbally respond with any of the choices. User selection may be of a person whose name and number is already in the contacts within the App and/or on the server. User may alternatively or additionally verbally enter a telephone number associated with a recipient device. Each verbal prompt by server may be performed using any suitable text-to-speech protocol and/or process; each verbal response from any user may be converted to text for comparison to and/or retrieval of data on server using any suitable speech-to-text protocol and/or process. Where a user of initiating device has more than one number associated with it, server may select a default number to be used as caller ID, for instance where user has specified such a default number. Server may alternatively or additionally transmit an audio request to user via initiating device to specify a number to be used as caller ID, which user may specify using a verbal response and/or according to any other process for such specification as provided in this disclosure. As a non-limiting illustration, server may respond with the following, "Are you calling from your office, direct line, or home?" and user may verbally respond with any of the choices. Server may finish the call with a confirmation message, such as without limitation the following: "Calling Bill Johnson's (WHICHEVER WAS CHOSEN) phone, with the caller ID of your WHICHEVER WAS CHOSEN)."

At step 1425, and still referring to FIG. 14, server may determine a second number of the destination device, for instance based on the user verbal response and/or responses; this may be performed, without limitation, as described above in reference to FIGS. 1-13. At step 1430 server creates an audio call between the originating device and the destination device based on the call from the originating device; this may be performed, without limitation, as described above in reference to FIGS. 1-13. Placement of call may be performed, without limitation, using any methods and/or method steps described above for provision of caller identification.

Referring now to FIG. 15, an exemplary embodiment of a method 1500 of call placement over a publicly switched telephone network is illustrated. At step 1505, a server 200 receives a first call from a first device to a first telephone number associated with the first device, wherein the call is received over a publicly switched telephone network; this may be implemented, without limitation, as described above in reference to FIGS. 1-14, for instance using a first telephone number associated with the first device that is stored on server 200 as set forth in further detail above.

At step 1510, server 200 identifies first device as a function of first telephone number; this may be performed, without limitation, as described above in reference to FIGS. 1-14. As a non-limiting example, identifying may include receiving, in first call, caller identification data associated with first device; caller identification data may be received in any manner described above in reference to FIGS. 1-15. Server 200 may retrieve, from memory of the server 200, user identification data associated with the first telephone number, which may be in any form described above in reference to FIGS. 1-15. Server 200 may verify caller identification data as a function of user identification data; for instance, and without limitation, caller identification data may be compared to user identification data. If data does not match, server 200 may terminate process as inauthentic, for instance and without limitation to screen out spoofed calls.

At step 1515, and still referring to FIG. 15, server 200 transmits call confirmation data to the first device. "Call confirmation data," as used herein, is data prompting a user of first device to confirm that the user is attempting to place a call, such as without limitation, any message indication a call attempt, a message asking the user whether the user intended to place a call, or the like. In an embodiment, transmitting call confirmation data to first device may transmitting a data packet over a network connection to the first device. Data packet may cause first device to display call confirmation data to a user of first device, for instance via an application operating on first device as described above in reference to FIGS. 1-14. Data packet may provide user a button or other data entry and/or command entry field permitting user to confirm and/or deny that user intends to place a call. In an embodiment, transmitting call confirmation data to first device may include placing a third call over PSTN to the first device; the third call may provide call confirmation data to a user of the first device. Where third call is placed, server 200 and/or first device may terminate first call. Call confirmation data may be placed via third call using audio data, such as a voice prompt generated by text to speech technology or the like.

At step 1520, and with continued reference to FIG. 15, server 200 receives, from the first device, a call initiation command as a function of the call confirmation data; this may be performed without limitation in any manner for initiation of calls as described above in reference to FIGS. 1-14. For instance, and without limitation, receiving the call initiation command may include receiving a data packet from the first device over a network, which may either confirm or deny that user has placed the call. Data packet may identify a user associated with a second device, an identifier of the second device, a telephone number of the second device, or the like; identification of the user of the second device may be used by server 200 to retrieve a telephone number for second call from contacts of user of first device or the like, for instance and without limitation as described above in reference to FIGS. 1-15. As a further non-limiting example, receiving call initiation command may include receiving a second phone number associated with the device from a native dialer on the first device; for instance, user may dial a phone number of second device. As a further non-limiting example, server 200 may receive call initiation command by receiving, over PSTN, a verbal identification of a second device; verbal identification may include any data suitable for identification of second device as described above, and may be analyzed using, without limitation, speech-to-text technology, which may be used to retrieve and/or identify a telephone number of second device. Verbal identification further comprises an identification of a user associated with a second device, such as a name, a user identifier and/or contact record identifier, for a record in contacts associated with user of first device, of the user associated with the second device.

At step 1525, server 200 initiates a second call over the publicly switched telephone network to a second device, as a function of the call initiation command; this may be performed, without limitation, as described above in reference to FIGS. 1-14. Placement of call may be performed, without limitation, using any methods and/or method steps described above for provision of caller identification.

Figure 16:
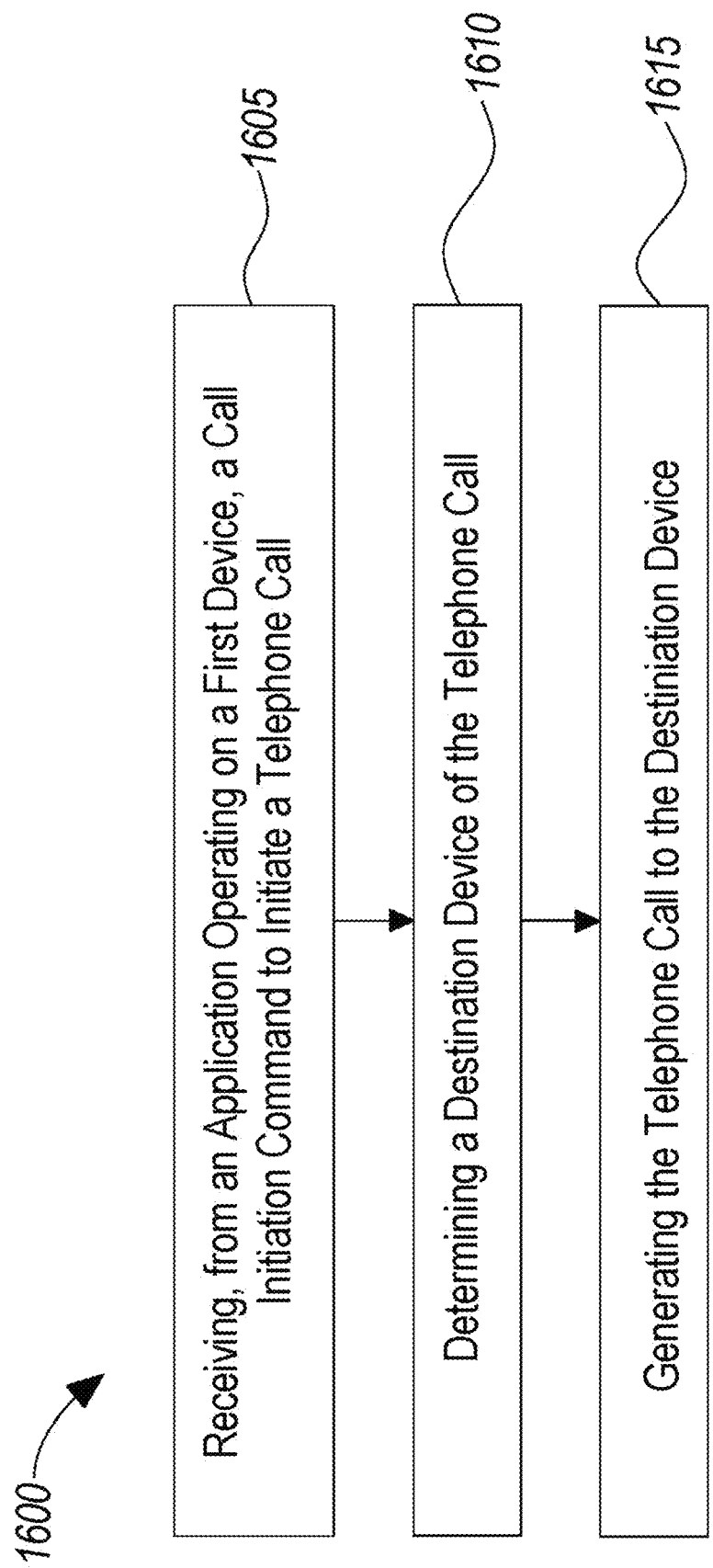
FIG. 16 is a flow diagram of one embodiment of a method of call placement over a publicly switched telephone network.

Referring now to FIG. 16, an exemplary embodiment of a method 1600 of call placement over a publicly switched telephone network is illustrated. At step 16 05, receiving, at a server 200, from an application operating on a first device, a call initiation command to initiate a telephone call; this may be implemented, without limitation, as described above in reference to FIGS. 1-15. For instance, and without limitation, receiving call initiation may include receiving an initial call from the first device over a publicly switched telephone network, where initial call may be received and/or associated with first device according to any process described above in reference to FIGS. 1-15. As a further non-limiting example, server 200 may receive a data communication, defined for these purposes as a data packet or text message as described above, from first device; the data communication may confirm that a user of the first device commanded the first device to generate the call initiation command. For instance, in an embodiment, user may open and/or access an application on first device and keypress a button or other command entry labeled "Make Call" or the like. A call may be placed via PSTN using first device's native dialer to server 200. Concurrently, first device and/or an application thereon as described above may transmit a data packet and/or text to server 200 that confirms user is making a call via PSTN. Server 200 may use user's caller identification data, for instance in combination with data packet and/or text message to authorize and authenticate call.

Alternatively or additionally, receiving the call initiation command may include receiving, from the application, a code request. A "code request," as defined in this disclosure, is a request for a passcode. A "passcode," as used in this disclosure, is an authorization datum by server 200 and/or a system and/or operator thereof, to place a call; passcode may be a one-time authorization datum, which once used is no longer valid as authorization. Server 200 may transmit a passcode to the first device. Server may cause application to display the passcode to the user. For instance, and without limitation, user may enter a command requesting password via an application operating on first device, for instance by entering a keypress of a button or other command entry field, which may be labeled "Call Password" or the like. First device and/or application may send server 200 a data communication requesting passcode. Passcodes may include without limitation a 2-10-digit code. Server 200 may receive an initial call from first device over PSTN. Server may prompt a user of first device to provide passcode in initial call and may proceed to place a call only if passcode is valid.

At step 1610, and still referring to FIG. 16, server 200 determines a destination device of telephone call; this may be implemented, without limitation, as described above in reference to FIGS. 1-15. For instance, and without limitation, determine a destination device of telephone call may include receiving an initial call over PSTN, optionally including receipt and/or request for a passcode as described above, and receiving, of the PSTN, a verbal identification of the second device. In a non-limiting example, server 200 may provide an audio prompt such as without limitation "Hi Susan, who would you like to call?" User may then say a name of a person to be called, which may correspond with names and numbers in a contacts database as described above in reference to FIGS. 1-15 or may verbally enter a telephone number. Alternatively or additionally, user may dial telephone number. In an embodiment, server 200 may respond that it is calling a second device and/or user there, such as without limitation via another audio prompt such as "Calling, Pablo Perez via your Office phone number." Determining a destination device of the telephone call may include receiving, from first device, a telephone number of the destination device. Server 200 may be dialed via PSTN automatically, for instance by a process automatically initiated from an application operating on first device. SCI server 200 may prompt a user of first device for passcode as described above; application may enable user to initiate automatic transmission of passcode, for instance by selecting an "Enter Password" button or the like, or key passcode in manually.

At step 1615, and further referring to FIG. 16, server 200 generates telephone call to destination device; this may be implemented, without limitation, as described above in reference to FIGS. 1-15. Placement of call may be performed, without limitation, using any methods and/or method steps described above for provision of caller identification.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 17:
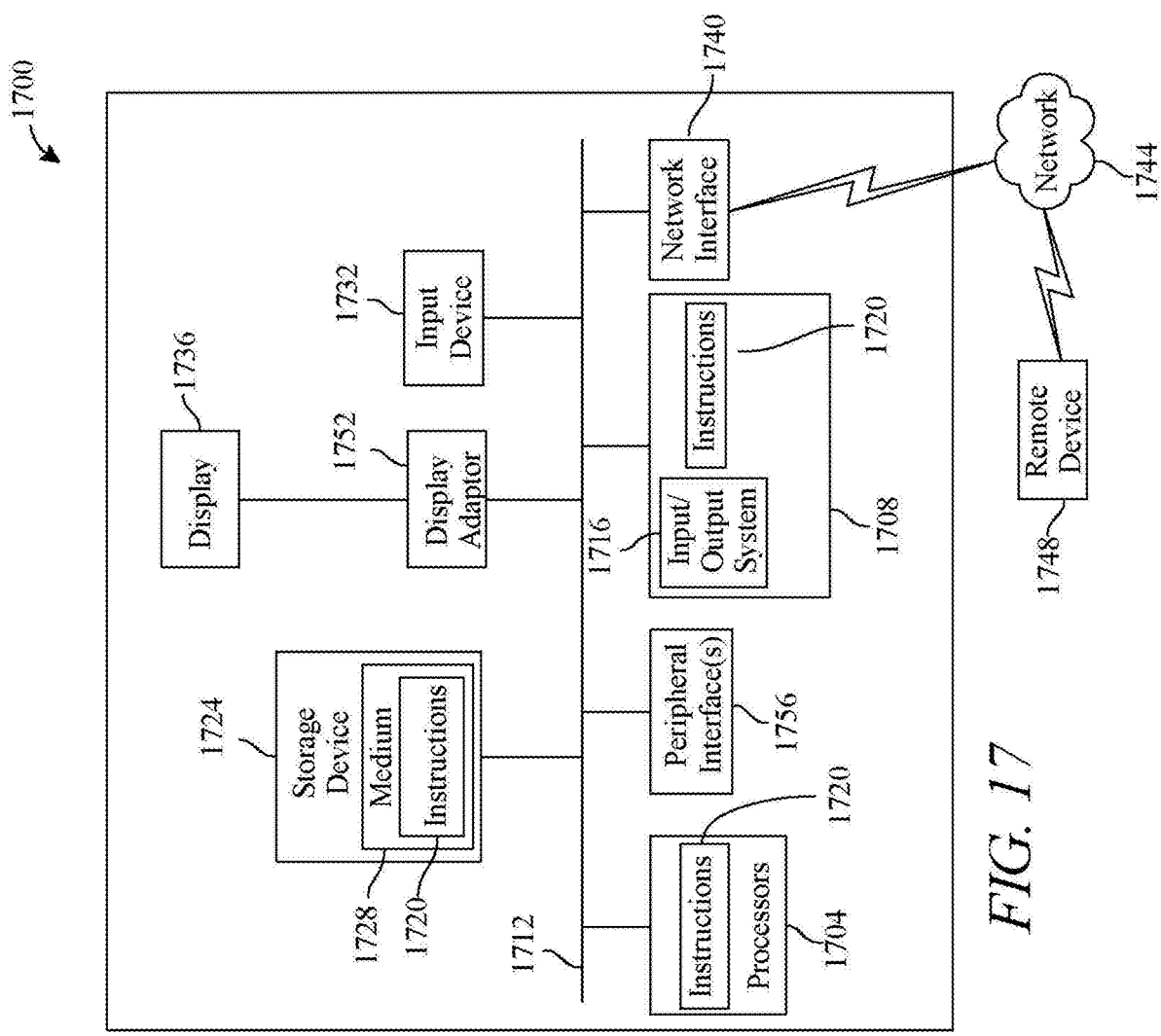
FIG. 17 is a block diagram of a computing system that can be used to implement any one or more of the methodologies disclosed herein and any one or more portions thereof.

FIG. 17 shows a diagrammatic representation of one embodiment of a computing device in the exemplary form of a computer system 1700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1700 includes a processor 1704 and a memory 1708 that communicate with each other, and with other components, via a bus 1712. Bus 1712 may include any of several types of bus structures including, but not limited to, a memory bus, a memory controller, a peripheral bus, a local bus, and any combinations thereof, using any of a variety of bus architectures.

Processor 1704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1708 may include various components (e.g., machine-readable media) including, but not limited to, a random-access memory component, a read only component, and any combinations thereof. In one example, a basic input/output system 1716 (BIOS), including basic routines that help to transfer information between elements within computer system 1700, such as during start-up, may be stored in memory 1708. Memory 1708 may also include (e.g., stored on one or more machine-readable media) instructions (e.g., software) 1720 embodying any one or more of the aspects and/or methodologies of the present disclosure. In another example, memory 1708 may further include any number of program modules including, but not limited to, an operating system, one or more application programs, other program modules, program data, and any combinations thereof.

Computer system 1700 may also include a storage device 1724. Examples of a storage device (e.g., storage device 1724) include, but are not limited to, a hard disk drive, a magnetic disk drive, an optical disc drive in combination with an optical medium, a solid-state memory device, and any combinations thereof. Storage device 1724 may be connected to bus 1712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1724 (or one or more components thereof) may be removably interfaced with computer system 1700 (e.g., via an external port connector (not shown)). Particularly, storage device 1724 and an associated machine-readable medium 1728 may provide nonvolatile and/or volatile storage of machine-readable instructions, data structures, program modules, and/or other data for computer system 1700. In one example, software 1720 may reside, completely or partially, within machine-readable medium 1728. In another example, software 1720 may reside, completely or partially, within processor 1704.

Computer system 1700 may also include an input device 1732. In one example, a user of computer system 1700 may enter commands and/or other information into computer system 1700 via input device 1732. Examples of an input device 1732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1732 may be interfaced to bus 1712 via any of a variety of interfaces (not shown) including, but not limited to, a serial interface, a parallel interface, a game port, a USB interface, a FIREWIRE interface, a direct interface to bus 1712, and any combinations thereof. Input device 1732 may include a touch screen interface that may be a part of or separate from display 1736, discussed further below. Input device 1732 may be utilized as a user selection device for selecting one or more graphical representations in a graphical interface as described above.

A user may also input commands and/or other information to computer system 1700 via storage device 1724 (e.g., a removable disk drive, a flash drive, etc.) and/or network interface device 1740. A network interface device, such as network interface device 1740, may be utilized for connecting computer system 1700 to one or more of a variety of networks, such as network 1744, and one or more remote devices 1748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1744, may employ a wired and/or a wireless mode of communication. In general, any network topology may be used. Information (e.g., data, software 1720, etc.) may be communicated to and/or from computer system 1700 via network interface device 1740.

Computer system 1700 may further include a video display adapter 1752 for communicating a displayable image to a display device, such as display device 1736. Examples of a display device include, but are not limited to, a liquid crystal display (LCD), a cathode ray tube (CRT), a plasma display, a light emitting diode (LED) display, and any combinations thereof. Display adapter 1752 and display device 1736 may be utilized in combination with processor 1704 to provide graphical representations of aspects of the present disclosure. In addition to a display device, computer system 1700 may include one or more other peripheral output devices including, but not limited to, an audio speaker, a printer, and any combinations thereof. Such peripheral output devices may be connected to bus 1712 via a peripheral interface 1756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for call placement over a publicly switched telephone network, the system comprising a first device having a first telephone number and first caller identification, wherein the first device is designed and configured to:
   place a first call to a server, wherein:
      the first call is placed to a second telephone number associated with the first device, and wherein the first call comprises an audio call; and
      the first call is transmitted over a publicly switched telephone network to the server;
   transmit data to the server via a different channel than the first call, wherein the data directs the server to associate predetermined caller identification with a second call to a second device, wherein the predetermined caller identification differs from the first caller identification; and
   initiate the second call.

2. The system of claim 1, wherein the data includes a third telephone number of the second device and the predetermined caller identification.

3. The system of claim 1, wherein the first device is configured to initiate the second call by:
   receiving call confirmation data from the server; and
   initiating the second call over the publicly switched telephone network to the second device as a function of the call confirmation data.

4. The system of claim 3, wherein receiving the call confirmation data from the server further comprises receiving a data packet over a network connection from the server, wherein the data packet causes the first device to display the call confirmation data to a user of the first device, and wherein the displayed call confirmation data comprises a prompt for the user to confirm or deny that user intends to place the second call.

5. The system of claim 3, wherein receiving the call confirmation data from the server further comprises receiving a third call over the publicly switched telephone network from the server, wherein the third call provides the call confirmation data to a user of the first device using audio data generated by text-to-speech technology.

6. The system of claim 5 wherein the first device is further configured to terminate the first call.

7. The system of claim 1, wherein initiating the second call further comprises transmitting a data packet from the first device over a network.

8. The system of claim 7, wherein the data packet identifies a user associated with the second device.

9. The system of claim 1, wherein the first device is further configured to initiate the second call by transmitting a third phone number associated with the second device using a native dialer on the first device.

10. The system of claim 1, wherein the first device is further configured to initiate the second call by transmitting, over the publicly switched telephone network, a verbal identification of the second device.

11. A method of call placement over a publicly switched telephone network, the method comprising:
    placing, by a first device having a first telephone number and first caller identification a first call to a server, wherein:
       the first call is placed to a second telephone number associated with the first device, and wherein the first call comprises an audio call; and
       the first call is transmitted over a publicly switched telephone network to the server;
    transmitting, by the first device, data to the server via a different channel than the first call, wherein the data directs the server to associate predetermined caller identification with a second call to a second device, wherein the predetermined caller identification differs from the first caller identification; and
    initiating, by the first device, the second call.

12. The method of claim 11, wherein the data includes a third telephone number of the second device and the predetermined caller identification.

13. The method of claim 11, wherein initiating the second call further comprises:
    receiving call confirmation data from the server; and
    initiating the second call over the publicly switched telephone network to the second device as a function of the call confirmation data.

14. The method of claim 13, wherein receiving the call confirmation data from the server further comprises receiving a data packet over a network connection from the server, wherein the data packet causes the first device to display the call confirmation data to a user of the first device, and wherein the displayed call confirmation data comprises a prompt for the user to confirm or deny that user intends to place the second call.

15. The method of claim 13, wherein receiving the call confirmation data from the server further comprises receiving a third call over the publicly switched telephone network from the server, wherein the third call provides the call confirmation data to a user of the first device using audio data generated by text-to-speech technology.

16. The method of claim 15 further comprising terminating the first call.

17. The method of claim 11, wherein initiating the second call further comprises transmitting a data packet from the first device over a network.

18. The method of claim 17, wherein the data packet identifies a user associated with the second device.

19. The method of claim 11, wherein initiating the second call further comprises transmitting a third phone number associated with the second device using a native dialer on the first device.

20. The method of claim 11, wherein initiating the second call further comprises transmitting, over the publicly switched telephone network, a verbal identification of the second device.

* * * * *